United States Patent
Wang

(10) Patent No.: US 12,047,931 B2
(45) Date of Patent: Jul. 23, 2024

(54) INFORMATION PROCESSING METHOD, INFORMATION PROCESSING DEVICE, TERMINAL AND COMPUTER READABLE STORAGE MEDIUM

(71) Applicant: DATANG MOBILE COMMUNICATIONS EQUIPMENT CO., LTD., Beijing (CN)

(72) Inventor: Da Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 375 days.

(21) Appl. No.: 17/425,674

(22) PCT Filed: Jan. 10, 2020

(86) PCT No.: PCT/CN2020/071370
§ 371 (c)(1),
(2) Date: Jul. 23, 2021

(87) PCT Pub. No.: WO2020/151502
PCT Pub. Date: Jul. 30, 2020

(65) Prior Publication Data
US 2022/0191885 A1 Jun. 16, 2022

(30) Foreign Application Priority Data
Jan. 25, 2019 (CN) .......................... 201910073754.2

(51) Int. Cl.
*H04W 72/12* (2023.01)
*H04W 48/10* (2009.01)

(52) U.S. Cl.
CPC .......... *H04W 72/12* (2013.01); *H04W 48/10* (2013.01)

(58) Field of Classification Search
CPC ..... H04W 72/12; H04W 48/10; H04W 72/20; H04W 92/18; H04W 72/121; H04W 72/542; H04L 67/60
See application file for complete search history.

(56) References Cited

U.S. PATENT DOCUMENTS 10,491,345 B2 * 11/2019 Chae ........................ H04L 5/001
10,638,506 B2 * 4/2020 Faurie .................... H04W 72/23
(Continued)

FOREIGN PATENT DOCUMENTS

CN 106817701 A 6/2017
CN 107846434 A 3/2018
(Continued)

OTHER PUBLICATIONS

Li et al., "Resource Management for 5G eV2X", Covinda Wireless, LLC, U.S. Appl. No. 62/790,731, Jan. 10, 2019, Total pp. 104 (Year: 2019).*
(Continued)

*Primary Examiner* — Shah M Rahman
(74) *Attorney, Agent, or Firm* — Ladas & Parry, LLP

(57) ABSTRACT

The embodiments of the present disclosure provide an information processing method, an information processing device, a terminal and a computer readable storage medium. The method includes: receiving first indication information sent by a second terminal, wherein the first indication information is used to indicate that the second terminal is able to schedule a sidelink resource; a number of the second terminal is greater than or equal to 1.

17 Claims, 8 Drawing Sheets

(56) References Cited

U.S. PATENT DOCUMENTS

| | | | | |
|---|---|---|---|---|
| 2011/0158187 | A1* | 6/2011 | Komamura | H04W 72/52 |
| | | | | 370/329 |
| 2017/0150330 | A1* | 5/2017 | Kim | H04W 76/10 |
| 2017/0230956 | A1* | 8/2017 | Kim | H04L 5/0032 |
| 2017/0245313 | A1* | 8/2017 | Kim | H04L 1/1671 |
| 2018/0115344 | A1* | 4/2018 | Xue | H04L 5/0012 |
| 2018/0139682 | A1* | 5/2018 | Xu | H04W 40/22 |
| 2018/0249470 | A1* | 8/2018 | Seo | H04W 72/53 |
| 2018/0352411 | A1 | 12/2018 | Ryu et al. | |
| 2019/0037622 | A1 | 1/2019 | Blasco Serrano et al. | |
| 2019/0230631 | A1 | 7/2019 | Zhao | |
| 2020/0037343 | A1* | 1/2020 | He | H04W 28/0268 |
| 2020/0059917 | A1* | 2/2020 | Feng | H04W 72/02 |
| 2020/0196255 | A1* | 6/2020 | Cheng | H04L 5/0064 |
| 2021/0167883 | A1* | 6/2021 | Yoon | H04W 56/002 |
| 2021/0219268 | A1* | 7/2021 | Li | H04W 72/20 |
| 2021/0243754 | A1 | 8/2021 | Zhao | |
| 2021/0314930 | A1* | 10/2021 | Uchiyama | H04W 4/40 |
| 2021/0392547 | A1* | 12/2021 | Tang | H04W 28/16 |
| 2022/0061026 | A1* | 2/2022 | Uchiyama | H04W 72/0446 |

FOREIGN PATENT DOCUMENTS

| | | | | |
|---|---|---|---|---|
| CN | 108347772 | A | | 7/2018 |
| CN | 108605213 | A | | 9/2018 |
| CN | 109155986 | A | | 1/2019 |
| CN | 109196888 | A | | 1/2019 |
| CN | 109246659 | A | | 1/2019 |
| EP | 2291043 | A1 | | 3/2011 |
| EP | 3273745 | A1 | | 1/2018 |
| EP | 3721664 | B1 * | 5/2023 | H04W 72/20 |
| WO | 2018228527 | A1 | | 12/2018 |

OTHER PUBLICATIONS

Cheng et al., "Method and Apparatus for SFCI Feedback Enhancement in V2X Unicast and Groupcast", U.S. Appl. No. 62/779,597 Dec. 14, 2018, Total pp. 19 (Year: 2018).*

First Korean Office Action for Korean Patent Application No. 10-2021-7026951, issued on Feb. 8, 2023, and its English translation provided by the Korean Patent Office.

"Analysis of Mode 2 resource schemes on sidelink," 3GPP TSG RAN WG1 Ad-Hoc Meeting 1901, R1-1900777, Taipei, Jan. 21-25, 2019, Source: ZTE, Sanechips, Agenda item: 7.2.4.1.4, all pages.

"On Synchronization for NR Sidelink" 3GPP TSG-RAN WG1 Meeting # ah-1901, R1-1901213, Taipei, Taiwan, Jan. 21-25, 2019 (Revision of R1-1813640), Agenda Item: 7.2.4.1.3, Source: Ericsson, all pages.

Huawei, HiSilicon, "Sidelink resource allocation mode 2", R1-1812209, 3GPP TSG RAN WG1 Meeting #95, Spokane, USA, Nov. 12-16, 2018, all pages.

First Office Action and search report from CN app. no. 201910073754. 2, dated Dec. 24, 2020, with English translation provided by Global Dossier, all pages.

International Search Report from PCT/CN2020/071370, dated Mar. 13, 2020, with English translation from WIPO, all pages.

Written Opinion of the International Searching Authority from PCT/CN2020/071370, dated Mar. 13, 2020, with English translation from WIPO, all pages.

International Preliminary Report on Patentability from PCT/CN2020/071370, dated Jul. 27, 2021, with English translation from WIPO, all pages.

Supplementary European Search Report for European Patent Application 20745558.5, issued on Feb. 25, 2022.

"On Sidelink Resource Allocation Mechanism" 3GPP TSG RAN WGI Meeting #95, R1-1812367, Spokane, USA, Nov. 12-16, 2018, Agenda item: 7.2.4.1.4, Source:MediaTek Inc.

"Signalling required for UE-NW relay selection" 3GPP TSG-RAN WG2 #90, Tdoc, R2-152462, Fukuoka, Japan, May 25-29, 2015, Agenda Item: 7.5.1.1, Source: Ericsson.

* cited by examiner

Receiving first indication information sent by a second terminal, wherein the first indication information is used to indicate that the second terminal can schedule a side link resource — 201

Sending first indication information to a first terminal, wherein the first indication information is used to indicate that the second terminal can schedule a side link resource — 301

FIG. 3

Receiving a broadcast signal and/or a synchronization signal sent by a second terminal — 401

Selecting a target second terminal from the second terminals according to the broadcast signal and/or synchronization signal — 402

FIG. 4

Sending a broadcast signal and/or a synchronization signal to a first terminal, so that the first terminal selects a target second terminal from the second terminal according to the broadcast signal and/or the synchronization signal — 501

FIG. 5

INFORMATION PROCESSING METHOD, INFORMATION PROCESSING DEVICE, TERMINAL AND COMPUTER READABLE STORAGE MEDIUM

CROSS-REFERENCE TO RELATED APPLICATIONS

This application is the U.S. national phase of PCT Application No. PCT/CN2020/071370 filed on Jan. 10, 2020, which claims a priority of the Chinese patent application No. 201910073754.2 filed on Jan. 25, 2019, the disclosures of which are incorporated herein by reference in their entireties.

TECHNICAL FIELD

The present disclosure relates to the field of communication technology, in particular to an information processing method, an information processing device, a terminal and a computer readable storage medium.

BACKGROUND

In the Long Term Evolution (LTE) technology, direct communication between devices is allowed. For ease of description, the direct communication link between devices is defined as a Sidelink (direct link), and a corresponding wireless interface is called the direct communication interface (also called the Sidelink interface); the cellular communication link between the network and the direct communication device is called a Uu link, and its corresponding interface is called a Uu interface.

In the LTE system, the service of the direct communication interface only supports the broadcast service. For the New Radio (NR), the service of the direct communication interface not only supports broadcast services, but also supports unicast and multicast services. And in the LTE system, Mode3 (Mode 3) and Mode 4 (Mode 4) are supported, where Mode3 is a resource allocation mode for network scheduling, and Mode4 is a resource allocation mode independently selected by the terminal. The NR subdivides the resource allocation mode independently selected by the terminal (Mode2 in NR). One of the subdivision modes is Mode2d (a resource allocation mode in which a terminal schedules other terminals). That is, a terminal (called a scheduling terminal) schedules the communication resources of other terminals (called a scheduled terminal).

However, in the related art, there is no solution on how the scheduled terminal determines the scheduling terminal in NR Mode2.

SUMMARY

The present disclosure provides an information processing method, an information processing device, a terminal and a computer readable storage medium for determining a scheduling terminal in NR Mode2.

In order to solve the above technical problem, the present disclosure is implemented as follows.

In first aspect, an embodiment of the present disclosure provides an information processing method applied to a first terminal, includes: receiving first indication information sent by a second terminal, wherein the first indication information is used to indicate that the second terminal is able to schedule a sidelink resource; a number of the second terminal is greater than or equal to 1.

In some embodiments, the receiving first indication information sent by a second terminal includes: receiving a broadcast signal sent by the second terminal, and the broadcast signal carrying the first indication information; and/or, receiving a synchronization signal sent by the second terminal, and the synchronization signal carrying the first indication information.

In some embodiments, the first indication information includes: a terminal type and/or a terminal identifier, and the terminal type is used to indicate that the second terminal is able to schedule the sidelink resource.

In some embodiments, the broadcast signal further includes at least one of the following: a band where a resource allocable by the second terminal is located; a pattern of the resource allocable by the second terminal.

In some embodiments, the method further includes: selecting a target second terminal from the second terminal, wherein a number of the target second terminal is an integer, and the number of the target second terminal is less than or equal to a number of the second terminal.

In some embodiments, the selecting a target second terminal from the second terminal includes: using a second terminal for which a received power of the broadcast signal and/or synchronization signal exceeds a first preset value as the target second terminal.

In some embodiments, the using a second terminal for which a received power of the broadcast signal and/or synchronization signal exceeds a first preset value as the target second terminal, includes: using a second terminal for which the received power of the broadcast signal and/or synchronization signal exceeds the first preset value and a band where an allocable resource is located is a band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

In some embodiments, the method further includes: triggering the first terminal to reselect the target second terminal when a trigger condition is met, wherein the trigger condition includes any one of the following: the received power of the broadcast signal and/or synchronization signal of the target second terminal is less than a second preset value; the band where the allocable resource of the target second terminal is located cannot meet a service transmission requirement of the first terminal; the allocable resource of the target second terminal cannot meet a service volume requirement of the first terminal; a number of times of the first terminal sending signaling for requesting a resource to the target second terminal is greater than a third preset value, and a resource allocated by the target second terminal is not received; the resources allocated by the target second terminal cannot meet a transmission delay or reliability requirement of the first terminal.

In some embodiments, in the case that the trigger condition is that the received power of the broadcast signal and/or synchronization signal of the target second terminal is less than a second preset value, the second preset value includes a fourth preset value and a fifth preset value, the fourth preset value is greater than the fifth preset value; the triggering the first terminal to reselect the target second terminal includes: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in the case that the received power of the broadcast signal and/or synchronization signal of the target second terminal is less than the fifth preset value, switching, by the first terminal, the target second terminal.

In some embodiments, the method further includes: receiving a sidelink resource sent by the target second terminal when the number of the target second terminal is greater than 0; or obtaining the sidelink resource through any mode other than Mode2d in a new radio (NR) system when the number of the target second terminal is 0.

In a second aspect, the present disclosure provides an information processing method applied to a second terminal, includes: sending first indication information to a first terminal, wherein the first indication information is used to indicate that the second terminal is able to schedule a sidelink resource; a number of the second terminal is greater than or equal to 1.

In some embodiments, the sending first indication information to a first terminal includes: sending a broadcast signal to the first terminal, the broadcast signal carrying the first indication information; and/or sending a synchronization signal to the first terminal, the synchronization signal carrying the first indication information.

In some embodiments, the first indication information includes: a terminal type and/or a terminal identifier, and the terminal type is used to indicate that the second terminal is able to schedule the sidelink resource.

In some embodiments, the broadcast signal further includes at least one of the following information: a band where a resource allocable by the second terminal is located; a pattern of the resource allocable by the second terminal.

In some embodiments, the method further includes: when the second terminal is the target second terminal, sending the sidelink resource to the first terminal.

In a third aspect, the present disclosure provides an information processing method applied to a first terminal, includes: receiving a broadcast signal and/or a synchronization signal sent by a second terminal; selecting a target second terminal from the second terminal according to the broadcast signal and/or synchronization signal, wherein the second terminal is able to schedule a sidelink resource, a number of the second terminal is greater than or equal to 1, a number of the target second terminal is an integer, and the number of the target second terminal is less than or equal to the number of second terminal.

In some embodiments, the selecting a target second terminal from the second terminal includes: using a second terminal for which a received power of the broadcast signal and/or synchronization signal exceeds a first preset value as the target second terminal.

In some embodiments, the using a second terminal for which a received power of the broadcast signal and/or synchronization signal exceeds a first preset value as the target second terminal, includes: using a second terminal for which the received power of the broadcast signal and/or synchronization signal exceeds the first preset value and a band where an allocable resource is located is a band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

In some embodiments, the method further includes: triggering the first terminal to reselect the target second terminal when a trigger condition is met, wherein the trigger condition includes any one of the following: the received power of the broadcast signal and/or synchronization signal of the target second terminal is less than a second preset value; the band where the allocable resource of the target second terminal is located cannot meet a service transmission requirement of the first terminal; the allocable resource of the target second terminal cannot meet a service volume requirement of the first terminal, a number of times of the first terminal sending signaling for requesting a resource to the target second terminal is greater than a third preset value, and a resource allocated by the target second terminal is not received; the resources allocated by the target second terminal cannot meet a transmission delay or reliability requirement of the first terminal.

In some embodiments, in the case that the trigger condition is that the received power of the broadcast signal and/or synchronization signal of the target second terminal is less than a second preset value, the second preset value includes a fourth preset value and a fifth preset value, the fourth preset value is greater than the fifth preset value; the triggering the first terminal to reselect the target second terminal includes: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in the case that the received power of the broadcast signal and/or synchronization signal of the target second terminal is less than the fifth preset value, switching, by the first terminal, the target second terminal.

In some embodiments, the method further includes: receiving a sidelink resource sent by the target second terminal when the number of the target second terminal is greater than 0; or obtaining the sidelink resource through any mode other than Mode2d in a new radio (NR) system when the number of the target second terminal is 0.

In some embodiments, the first indication information is carried in the broadcast signal; and/or the first indication information is carried in the synchronization signal; the first indication information is used to indicate that the second terminal is able to schedule the sidelink resource.

In some embodiments, the first indication information includes: a terminal type and/or a terminal identifier, and the terminal type is used to indicate that the second terminal is able to schedule the sidelink resource.

In some embodiments, the broadcast signal further includes at least one of the following information: a band where a resource allocable by the second terminal is located; a pattern of the resource allocable by the second terminal.

In a fourth aspect, the present disclosure provides an information processing method applied to a second terminal, includes: sending a broadcast signal and/or a synchronization signal to the first terminal, so that the first terminal selects a target second terminal from the second terminal according to the broadcast signal and/or the synchronization signal; wherein the second terminal is able to schedule a sidelink resource, a number of the second terminal is greater than or equal to 1, a number of the target second terminal is an integer, and the number of the target second terminal is less than or equal to the number of the second terminal.

In some embodiments, the method further includes: in the case that the second terminal is the target second terminal, sending the sidelink resource to the first terminal.

In some embodiments, the first indication information is carried in the broadcast signal; and/or the first indication information is carried in the synchronization signal; the first indication information is used to indicate that the second terminal is able to schedule the sidelink resource.

In some embodiments, the first indication information includes: a terminal type and/or a terminal identifier, and the terminal type is used to indicate that the second terminal is able to schedule the sidelink resource.

In some embodiments, the broadcast signal further includes at least one of the following information: a band where a resource allocable by the second terminal is located; a pattern of the resource allocable by the second terminal.

In a fifth aspect, the present disclosure provides a terminal, includes: a transceiver, a memory, a processor, and a program stored in the memory and executed by the processor; wherein, The transceiver is configured to receive first indication information sent by a second terminal, wherein the first indication information is used to indicate that the second terminal is able to schedule a sidelink resource; a number of the second terminal is greater than or equal to 1.

In some embodiments, the transceiver is further configured to: receive a broadcast signal sent by the second terminal, and the broadcast signal carrying the first indication information; and/or, receive a synchronization signal sent by the second terminal, and the synchronization signal carrying the first indication information.

In some embodiments, the processor is further configured to read the program in the memory under the control of the processor, and execute the following process: selecting a target second terminal from the second terminal, wherein a number of the target second terminal is an integer, and the number of the target second terminal is less than or equal to a number of the second terminal.

In some embodiments, the processor is further configured to read the program in the memory and execute the following process: using a second terminal for which a received power of the broadcast signal and/or synchronization signal exceeds a first preset value as the target second terminal.

In some embodiments, the processor is further configured to read the program in the memory and execute the following process: using a second terminal for which the received power of the broadcast signal and/or synchronization signal exceeds the first preset value and a band where an allocable resource is located is a band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

In some embodiments, the processor is further configured to read the program in the memory and execute the following process: triggering the first terminal to reselect the target second terminal when a trigger condition is met, wherein the trigger condition includes any one of the following: the received power of the broadcast signal and/or synchronization signal of the target second terminal is less than a second preset value; the band where the allocable resource of the target second terminal is located cannot meet a service transmission requirement of the first terminal; the allocable resource of the target second terminal cannot meet a service volume requirement of the first terminal, a number of times of the first terminal sending signaling for requesting a resource to the target second terminal is greater than a third preset value, and a resource allocated by the target second terminal is not received; the resources allocated by the target second terminal cannot meet a transmission delay or reliability requirement of the first terminal.

In some embodiments, in the case that the trigger condition is that the received power of the broadcast signal and/or synchronization signal of the target second terminal is less than a second preset value, the second preset value includes a fourth preset value and a fifth preset value, the fourth preset value is greater than the fifth preset value; the processor is further configured to read the program in the memory and execute the following process: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in the case that the received power of the broadcast signal and/or synchronization signal of the target second terminal is less than the fifth preset value, switching, by the first terminal, the target second terminal.

In some embodiments, the processor is further configured to read the program in the memory and execute the following process: receiving a sidelink resource sent by the target second terminal when the number of the target second terminal is greater than 0; or obtaining the sidelink resource through any mode other than Mode2d in a new radio (NR) system when the number of the target second terminal is 0.

In a sixth aspect, a terminal, includes: a transceiver, a memory, a processor, and a program stored on the memory and executed by the processor; wherein the transceiver is configured to send first indication information to a first terminal, wherein the first indication information is used to indicate that the second terminal is able to schedule a sidelink resource; a number of the second terminal is greater than or equal to 1.

In some embodiments, the transceiver is further configured to send a broadcast signal to the first terminal, the broadcast signal carrying the first indication information; and/or send a synchronization signal to the first terminal, the synchronization signal carrying the first indication information.

In some embodiments, the transceiver is further configured to, under the control of the processor, in the case that the terminal is a target terminal, send the sidelink resource to the first terminal.

In a seventh aspect, a terminal, includes: a transceiver, a memory, a processor, and a program stored in the memory and executed by the processor; wherein, the transceiver is configured to receive a broadcast signal and/or a synchronization signal sent by a second terminal under the control of the processor; and select a target second terminal from the second terminal according to the broadcast signal and/or synchronization signal; or the transceiver is configured to receive the broadcast signal and/or synchronization signal sent by the second terminal under the control of the processor; the processor is configured to read the program in the memory and execute the following process: selecting a target second terminal from the second terminal according to the broadcast signal and/or synchronization signal; wherein the second terminal is able to schedule a sidelink resource, a number of the second terminal is greater than or equal to 1, a number of the target second terminal is an integer, and the number of the target second terminal is less than or equal to the number of second terminal.

In some embodiments, the processor is configured to read the program in the memory and execute the following process: using a second terminal for which a received power of the broadcast signal and/or synchronization signal exceeds a first preset value as the target second terminal.

In some embodiments, the processor is configured to read the program in the memory and execute the following process: using a second terminal for which the received power of the broadcast signal and/or synchronization signal exceeds the first preset value and a band where an allocable resource is located is a band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

In some embodiments, the processor is configured to read the program in the memory and execute the following process: triggering the first terminal to reselect the target second terminal when a trigger condition is met, wherein the trigger condition includes any one of the following: the received power of the broadcast signal and/or synchronization signal of the target second terminal is less than a second preset value; the band where the allocable resource of the target second terminal is located cannot meet a service transmission requirement of the first terminal; the allocable resource of the target second terminal cannot meet a service volume requirement of the first terminal, a number of times of the first terminal sending signaling for requesting a resource to the target second terminal is greater than a third preset value, and a resource allocated by the target second terminal is not received; the resources allocated by the target second terminal cannot meet a transmission delay or reliability requirement of the first terminal.

In some embodiments, wherein in the case that the trigger condition is that the received power of the broadcast signal and/or synchronization signal of the target second terminal is less than a second preset value, the second preset value includes a fourth preset value and a fifth preset value, the fourth preset value is greater than the fifth preset value; the triggering the first terminal to reselect the target second terminal includes: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in the case that the received power of the broadcast signal and/or synchronization signal of the target second terminal is less than the fifth preset value, switching, by the first terminal, the target second terminal.

In some embodiments, the processor is configured to read the program in the memory and execute the following process: receiving a sidelink resource sent by the target second terminal when the number of the target second terminal is greater than 0; or obtaining the sidelink resource through any mode other than Mode2d in a new radio (NR) system when the number of the target second terminal is 0.

In an eighth aspect, the present disclosure provides a terminal, includes: a transceiver, a memory, a processor, and a program stored on the memory and executed by the processor; wherein, the transceiver is configured to send a broadcast signal and/or a synchronization signal to the first terminal, so that the first terminal selects a target second terminal from the second terminal according to the broadcast signal and/or the synchronization signal; wherein the second terminal is able to schedule a sidelink resource, a number of the second terminal is greater than or equal to 1, a number of the target second terminal is an integer, and the number of the target second terminal is less than or equal to the number of the second terminal.

In some embodiments, the processor is configured to read the program in the memory and execute the following process: in the case that the second terminal is the target second terminal, sending the sidelink resource to the first terminal.

In a ninth aspect, the present disclose provides an information processing device, provided in a first terminal, includes: a first receiving module, configured to receive first indication information sent by a second terminal, wherein the first indication information is used to indicate that the second terminal is able to schedule a sidelink resource; a number of the second terminal is greater than or equal to 1.

In some embodiments, the information processing device further includes: a selecting module, configured to select a target second terminal from the second terminal, wherein a number of the target second terminal is an integer, and the number of the target second terminal is less than or equal to a number of the second terminal.

In some embodiments, the information processing device further includes: a second receiving module, configured to receive a sidelink resource sent by the target second terminal when the number of the target second terminal is greater than 0; or obtain the sidelink resource through any mode other than Mode2d in a new radio (NR) system when the number of the target second terminal is 0.

In a tenth aspect, the present disclosure provides an information processing device, provided in a second terminal, includes: a first sending module, configured to send first indication information to a first terminal, wherein the first indication information is used to indicate that the second terminal is able to schedule a sidelink resource; a number of the second terminal is greater than or equal to 1.

In some embodiments, the information processing device further includes: a second sending module, configured to send the sidelink resource to the first terminal when the second terminal is the target second terminal.

In an eleventh aspect, the present disclosure provides an information processing device, provided in a first terminal, includes: a first receiving module, configured to receive a broadcast signal and/or a synchronization signal sent by a second terminal; a selecting module, configured to select a target second terminal from the second terminal according to the broadcast signal and/or synchronization signal; wherein the second terminal is able to schedule a sidelink resource, a number of the second terminal is greater than or equal to 1, a number of the target second terminal is an integer, and the number of the target second terminal is less than or equal to the number of second terminal.

In some embodiments, the information processing device further includes: a second receiving module, configured to receive a sidelink resource sent by the target second terminal when the number of the target second terminal is greater than 0; or obtain the sidelink resource through any mode other than Mode2d in a new radio (NR) system when the number of the target second terminal is 0.

In a twelfth aspect, the present disclosure provides an information processing device, provided in a second terminal, includes: a first sending module, configured to send a broadcast signal and/or a synchronization signal to the first terminal, so that the first terminal selects a target second terminal from the second terminal according to the broadcast signal and/or the synchronization signal; wherein the second terminal is able to schedule a sidelink resource, a number of the second terminal is greater than or equal to 1, a number of the target second terminal is an integer, and the number of the target second terminal is less than or equal to the number of the second terminal.

In some embodiments, the information processing device further includes: a second sending module, configured to send the sidelink resource to the first terminal when the second terminal is the target second terminal.

In a thirteenth aspect, the present disclosure provides a computer readable storage medium for storing a program, wherein the program is executed by a processor to implement the steps in the information processing method.

In the embodiments of the present disclosure, the first terminal can determine that the second terminal can schedule the sidelink resource according to the first indication information or the broadcast signal or the synchronization signal sent by the second terminal, so as to determine the scheduling terminal in the NR Mode2.

BRIEF DESCRIPTION OF THE DRAWINGS

In order to explain the technical solutions of the embodiments of the present disclosure more clearly, the following will briefly introduce the accompanying drawings used in the description of the embodiments of the present disclosure. Obviously, the accompanying drawings in the following description are only some embodiments of the present disclosure. For those of ordinary skill in the art, other drawings can be obtained based on these drawings without creative work.

FIG. 3 is the second flowchart of the information processing method provided by an embodiment of the present disclosure;

FIG. 4 is the third flowchart of the information processing method provided by an embodiment of the present disclosure;

FIG. 5 is the fourth flow chart of the information processing method provided by an embodiment of the present disclosure;

DETAILED DESCRIPTION

The technical solutions in the embodiments of the present disclosure will be clearly and completely described below in conjunction with the drawings in the embodiments of the present disclosure. Obviously, the described embodiments are a part of the embodiments of the present disclosure, but not all of the embodiments. Based on the embodiments in the present disclosure, all other embodiments obtained by those of ordinary skill in the art without creative work shall fall within the protection scope of the present disclosure.

Figures 1, 2:
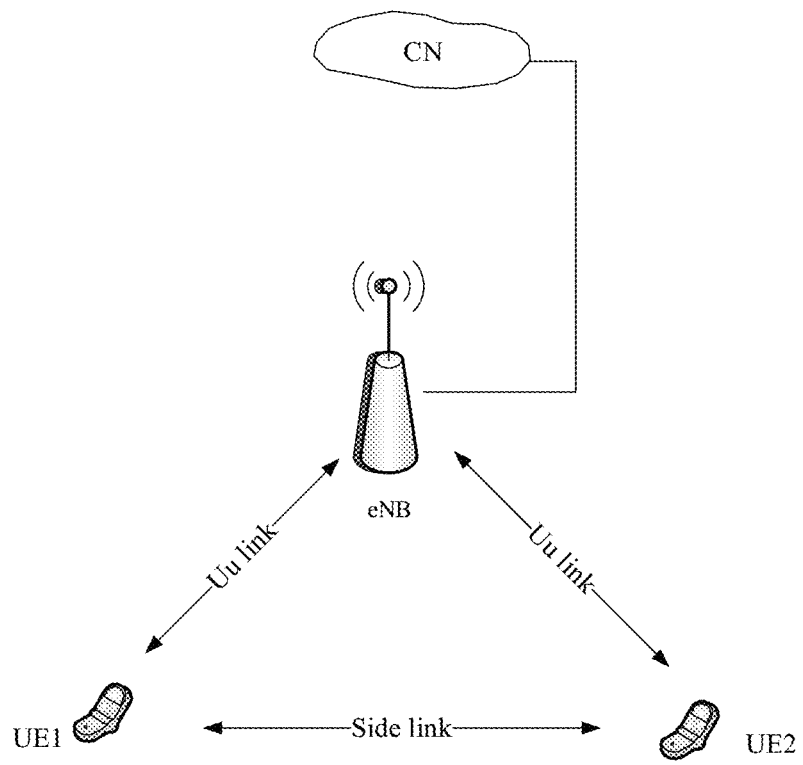
FIG. 1 is a schematic diagram of V2X communication in the related art.
FIG. 2 is the first flowchart of the information processing method provided by an embodiment of the present disclosure.

FIG. 1 is a schematic diagram of Vehicle to Everything (V2X) communication in the related art. Direct communication between devices is allowed. For ease of description, the direct communication link between devices is defined as a Sidelink (direct link), and the corresponding wireless interface is called a direct communication interface (also called a Sidelink interface); the cellular communication link between the network and the direct communication device is called a Uu link, and its corresponding interface is called a Uu interface.

The direct communication devices can be all on the network, or all off the network, or some devices can be on the network and some devices can be off the network. The so-called on the network means that the direct communication device is located within the coverage of the 3GPP base station communication carrier, and the so-called off the network means that the direct communication device is not within the coverage of the 3GPP base station communication carrier.

Typical direct communication scenarios include the following three types: one-to-one communication between direct communication terminals (unicast); one device can send the same data to all devices in a communication group at a time (multicast); one device can send the same data to all devices in a communication group at a time (multicast); one device can send the same data to all nearby devices (broadcast).

The direct communication interface in the LTE system supports two resource allocation modes: a resource allocation mode scheduled by the network, in which the network allocates resources to the terminal according to the Sidelink Buffer status reporting (BSR) reported by the terminal (also called Mode 3); a resource allocation mode independently selected by the terminal, in which the terminal selects a resource from pre-configured transmission resources or transmission resources broadcasted by the network for transmission on the direct communication link (also called Mode 4).

The resource allocation mode scheduled by the network in direct communication in the NR system is called Mode 1, and the resource allocation mode selected by the terminal is called Mode 2. For Mode2, it is subdivided into 4 sub-modes.

Mode 2a: a resource allocation mode selected by the terminal;

Mode2b: a resource allocation mode selected by another terminal with the assist of the terminal;

Mode2c: a resource allocation mode based on network configuration authorization;

Mode2d: a resource allocation mode in which the terminal schedules other terminals.

Therefore, it can be seen from the above that for NR, the service of the direct communication interface will be more abundant than LTE, and the resource allocation mode Mode2d in which the terminal schedules other terminals is introduced. However, there is no solution on how to determine the scheduling terminal in the related art.

To solve the above-mentioned problems, embodiments of the present disclosure provide an information processing method and an information processing device. Hereinafter, the specific implementation will be described in detail in conjunction with specific embodiments.

FIG. 2 is a flowchart of an information processing method provided by an embodiment of the present disclosure, which is applied to a first terminal. As shown in FIG. 2, it includes the following steps.

Step 201: Receiving first indication information sent by a second terminal, wherein the first indication information is used to indicate that the second terminal can schedule a sidelink resource; a number of the second terminals is greater than or equal to 1.

Among them, in the embodiment of the present disclosure, the second terminal may schedule the sidelink resource, that is, the second terminal is a terminal having a function of scheduling the sidelink resource.

In practical applications, to facilitate the first terminal to obtain the indication information, this step may specifically include: receiving a broadcast signal sent by the second terminal, and the broadcast signal carrying the first indication information; and/or, receiving a synchronization signal sent by the second terminal, and the synchronization signal carrying the first indication information.

The first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In addition, in order to facilitate the first terminal to select the second terminal to send the sidelink resource, the broadcast signal also includes at least one of the following information: a band where the resource that can be allocated by the second terminal is located; a pattern of the resource that can be allocated by the second terminal, such as a semi-static scheduling pattern (SPS pattern) or a configured grant pattern.

In the embodiment of the present disclosure, the first terminal can determine that the second terminal can schedule the sidelink resource according to the first indication information sent by the second terminal, thereby realizing the determination of the scheduling terminal in NR Mode2.

On the basis of the foregoing embodiment, in order to facilitate obtaining the sidelink resource, the method may further include: selecting a target second terminal from the second terminals; wherein the number of the target second terminal is an integer, and the number of the target second terminal is less than or equal to the number of the second terminals.

Specifically, the second terminal for which a received power of the broadcast signal and/or synchronization signal exceeds the first preset value may be used as the target second terminal. Wherein, the first preset value can be set arbitrarily, and can be specified by a standard, or configured by a network device, or pre-configured.

In practical applications, according to information included in the broadcast signal and/or synchronization signal, a second terminal for which the received power of the broadcast signal and/or synchronization signal exceeds the first preset value and a band where an allocable resource is located is the band supported by the first terminal is used as the target second terminal; or a second terminal for which the received power of the broadcast signal and/or synchronization signal exceeds the first preset value and a pattern of the allocable resource meets requirements of a service supported by the first terminal is used as the target second terminal.

If the currently selected target second terminal cannot meet the requirements, the first terminal may also be triggered to reselect the target second terminal when the trigger condition is met.

Wherein, the trigger condition can be any one of the following:

(1) The received power of the broadcast signal and/or synchronization signal of the target second terminal is less than a second preset value; the second preset value can be set arbitrarily, and may be specified by the standard or configured by the network device, or pre-configured.

(2) The band where the allocable resource of the target second terminal is located cannot meet the service transmission requirement of the first terminal. Optionally, the second terminal cannot adjust the band of the allocable resource.

(3) The allocable resource of the target second terminal cannot meet the service volume demand of the first terminal. Optionally, the second terminal cannot adjust the allocable resource.

(4) The number of times the first terminal sends signaling for requesting a resource to the target second terminal is greater than a third preset value, and a resource allocated by the target second terminal is not received. The third preset value can be set arbitrarily, and can be specified by a standard, or configured by a network device, or pre-configured.

(5) The resources allocated by the target second terminal cannot meet the transmission delay or reliability requirements of the first terminal. Optionally, the second terminal cannot adjust the allocable resource.

To avoid false triggering of reselection, the second preset value includes a fourth preset value and a fifth preset value, wherein the fourth preset value is greater than the fifth preset value. Then, this step is specifically: in the case that the received power of the broadcast signal and/or synchronization signal of the target second terminal is less than a fourth preset value and greater than a fifth preset value, triggering the first terminal to reselect the target second terminal, wherein the first terminal does not switch the target second terminal; in the case that the received power of the broadcast signal and/or synchronization signal of the target second terminal is less than the fifth preset value, the first terminal switches the target second terminal. The fourth preset value and the fifth preset value can be set arbitrarily, and can be specified by a standard, configured by a network device, or pre-configured.

Then, after the target second terminal is selected, if the number of the selected target second terminal is greater than 0, the sidelink resource allocated by the selected target second terminal may be received. If the target second terminal is not selected, then the sidelink resources can be obtained in any mode other than Mode 2d, for example, Mode 1, Mode 2a, Mode 2b, Mode 2c, and so on.

FIG. 3 is a flowchart of an information processing method provided by an embodiment of the present disclosure, which is applied to a second terminal. As shown in FIG. 3, it includes the following steps.

Step 301: sending first indication information to a first terminal, wherein the first indication information is used to indicate that the second terminal can schedule a sidelink resource; the number of the second terminals is greater than or equal to 1.

Specifically, to facilitate the first terminal to obtain the first indication information, this step may specifically be: sending a broadcast signal to the first terminal, the broadcast signal carrying the first indication information; and/or sending a synchronization signal to the first terminal, the synchronization signal carrying the first indication information.

The first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In order to facilitate the first terminal to select the second terminal, the broadcast signal also includes at least one of the following information: a band where a resource allocable by the second terminal is located; a pattern of the resource allocable by the second terminal.

In the embodiment of the present disclosure, the first terminal can determine that the second terminal can schedule the sidelink resource according to the first indication information sent by the second terminal, thereby realizing the determination of the scheduling terminal in NR Mode2.

In order to enable the first terminal to obtain the sidelink resource, based on the above-mentioned embodiment, the method may further include: in the case that the second terminal is the target second terminal, sending the sidelink resource to the first terminal.

FIG. 4 is a flowchart of an information processing method provided by an embodiment of the present disclosure, which is applied to a first terminal. As shown in FIG. 4, it includes the following steps.

Step 401: Receiving a broadcast signal and/or a synchronization signal sent by a second terminal.

Step 402: Selecting a target second terminal from the second terminals according to the broadcast signal and/or synchronization signal.

Wherein, the second terminal can schedule the sidelink resource, the number of the second terminal is greater than or equal to 1, the number of the target second terminal is an integer, and the number of the target second terminal is less than or equal to the number of second terminals.

When selecting the target second terminal, a second terminal for which a received power of the broadcast signal and/or synchronization signal exceeds a first preset value may be used as the target second terminal.

Specifically, a second terminal for which the received power of the broadcast signal and/or synchronization signal exceeds the first preset value and a band where an allocable resource is located is the band supported by the first terminal is used as the target second terminal; or a second terminal for which the received power of the broadcast signal and/or synchronization signal exceeds the first preset value and a pattern of the allocable resource meets requirements of a service supported by the first terminal is used as the target second terminal. Wherein, the first preset value can be set arbitrarily, and can be specified by a standard, or configured by a network device, or pre-configured.

To facilitate the first terminal to select the target second terminal, the broadcast signal carries first indication information, and/or the synchronization signal carries first indication information; the first indication information is used to indicate the second terminal can schedule sidelink resource. The first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In addition, the broadcast signal also includes at least one of the following information: a band where a resource allocable by the second terminal is located; a pattern of the resource allocable by the second terminal.

If the currently selected target second terminal cannot meet the requirements, the first terminal may also be triggered to reselect the target second terminal when the trigger condition is met.

Wherein, the trigger condition can be any one of the following:

(1) The received power of the broadcast signal and/or synchronization signal of the target second terminal is less than a second preset value; the second preset value can be set arbitrarily, and may be specified by the standard or configured by the network device, or pre-configured.

(2) The band where the allocable resource of the target second terminal is located cannot meet the service transmission requirement of the first terminal. Optionally, the second terminal cannot adjust the band of the allocable resource.

(3) The allocable resource of the target second terminal cannot meet the service volume demand of the first terminal. Optionally, the second terminal cannot adjust the allocable resource.

(4) The number of times the first terminal sends signaling for requesting a resource to the target second terminal is greater than a third preset value, and a resource allocated by the target second terminal is not received. The third preset value can be set arbitrarily, and can be specified by a standard, or configured by a network device, or pre-configured.

(5) The resources allocated by the target second terminal cannot meet the transmission delay or reliability requirements of the first terminal. Optionally, the second terminal cannot adjust the allocable resource.

To avoid false triggering of reselection, the second preset value includes a fourth preset value and a fifth preset value, wherein the fourth preset value is greater than the fifth preset value. Then, this step is specifically: in the case that the received power of the broadcast signal and/or synchronization signal of the target second terminal is less than a fourth preset value and greater than a fifth preset value, triggering the first terminal to reselect the target second terminal, wherein the first terminal does not switch the target second terminal; in the case that the received power of the broadcast signal and/or synchronization signal of the target second terminal is less than the fifth preset value, the first terminal switches the target second terminal. The fourth preset value and the fifth preset value can be set arbitrarily, and can be specified by a standard, configured by a network device, or pre-configured.

Then, after the target second terminal is selected, if the number of the selected target second terminal is greater than 0, the sidelink resource allocated by the selected target second terminal may be received. If the target second terminal is not selected, then the sidelink resources can be obtained in any mode other than Mode 2d, for example, Mode 1, Mode 2a, Mode 2b, Mode 2c, and so on.

In the embodiment of the present disclosure, the first terminal may select the target second terminal from the second terminals according to the broadcast signal and/or the synchronization signal sent by the second terminal, thereby realizing the selection of the scheduling terminal in NR Mode2.

FIG. 5 is a flowchart of an information processing method provided by an embodiment of the present disclosure, which is applied to a second terminal. As shown in FIG. 5, it includes the following steps.

Step 501: Sending a broadcast signal and/or a synchronization signal to a first terminal, so that the first terminal selects a target second terminal from the second terminal according to the broadcast signal and/or the synchronization signal.

Wherein, the second terminal can schedule the sidelink resource, the number of the second terminal is greater than or equal to 1, the number of the target second terminal is an integer, and the number of the target second terminal is less than or equal to the number of second terminals.

To facilitate the first terminal to select the target second terminal, the broadcast signal carries the first indication information; and/or, the synchronization signal carries the first indication information; the first indication information is used to indicate that the second terminal can schedule the sidelink resource. The first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In addition, the broadcast signal also includes at least one of the following information: a band where a resource allocable by the second terminal is located; a pattern of the resource allocable by the second terminal, such as a semi-static scheduling pattern (SPS pattern) or a configured grant pattern.

In the embodiment of the present disclosure, the first terminal can determine that the second terminal can schedule the sidelink resource according to the first indication information sent by the second terminal, thereby realizing the determination of the scheduling terminal in NR Mode2.

The following embodiment takes the unicast service in the NR direct connection system as an example for description.

The multicast service is similar, the difference is that there are multiple receiving terminals.

Figure 6:
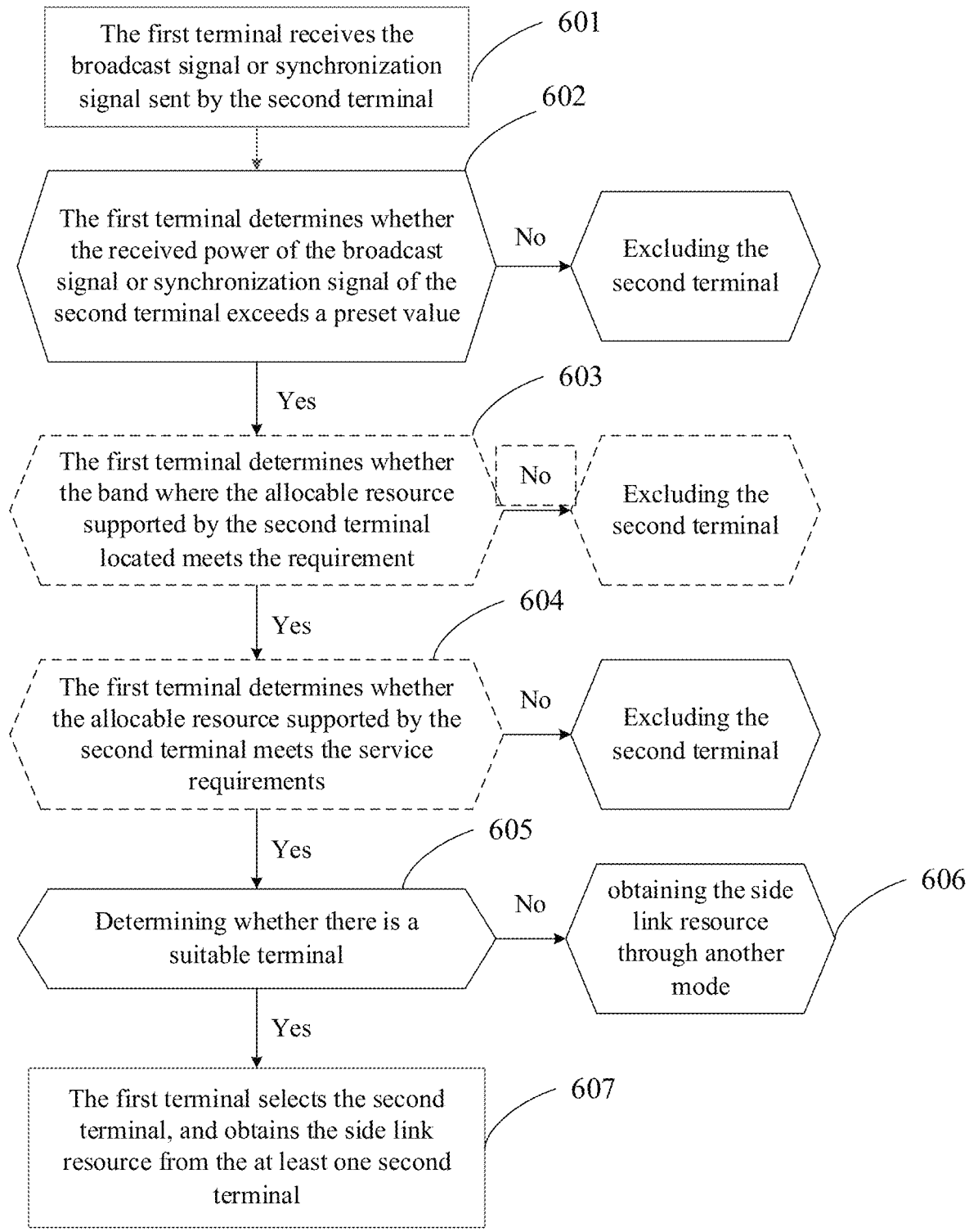
FIG. 6 is the fifth flowchart of the information processing method provided by an embodiment of the present disclosure.

As shown in FIG. 6, the process of the first terminal initially selecting the target second terminal includes:

Step 601: The first terminal receives the broadcast signal or synchronization signal sent by the second terminal.

Wherein, the broadcast signal sent by the second terminal is periodically broadcasted and includes:
(1) Terminal type indication information, for example, M bits are used to indicate that it is a scheduling terminal, and M is a positive integer greater than 0. For example, M=3, when it is "000", it means that the terminal is a scheduling terminal that can schedule the sidelink resource. For another example, the terminal type indication information is sequence N, or a seed for generating the sequence N, the sequence N is used to scramble broadcast information;
(2) Optionally, a band where the resource allocable by the terminal are located;
(3) Optionally, a pattern of the resource allocable by the terminal, such as SPS pattern or configured grant pattern, etc.;
(4) Terminal ID.

At this time, a candidate set is set to be empty. The candidate set is used to store information of the second terminal that can be selected by the first terminal.

Step 602: The first terminal determines whether the received power of the broadcast signal or synchronization signal of the second terminal exceeds a preset value.

Among them, the preset value can be specified by the standard, or system configuration, or pre-configuration. If the received power exceeds the preset value, the second terminal is a candidate terminal and is placed in the candidate set. If the received power is lower than the threshold, it means that the first terminal is far from the second terminal, and the second terminal is excluded.

Step 603: The first terminal determines whether the band where the allocable resource supported by the second terminal located meets the requirement.

Specifically, the first terminal determines whether the band where the allocable resource supported by the second terminal is located meets the demand according to the frequency band information where the allocable resource is carried in the broadcast message of the second terminal. If the requirement is met, the second terminal is a candidate terminal and is placed in the candidate set; if the requirement is not met, the second terminal is excluded from the candidate set.

Step 604: The first terminal determines whether the allocable resource supported by the second terminal meets the service requirements.

Among them, service requirements include: a delay requirement, a reliability requirement, or a service volume requirement, etc. The first terminal determines whether the allocable resource supported by the second terminal meets the service requirements according to the pattern of the allocable resource carried in the broadcast message of the second terminal, such as the SPS pattern or the configured grant pattern. If the requirement is met, the second terminal is a candidate terminal and is placed in the candidate set; if the requirement is not met, the second terminal is excluded from the candidate set.

Step 603 and step 604 are optional steps. Moreover, there is no sequential relationship between step 603 and step 604. That is, step 604 may be performed first on the basis of step 602, and then step 603 may be performed on the basis of step 604.

Step 605: Determining whether there is a suitable terminal in the candidate set.

Step 606: If the candidate set is empty, the first terminal obtains the sidelink resource through another mode (for example, mode1 or mode2a or mode2c, etc.).

Step 607: The first terminal selects the second terminal.

If only one second terminal is in the candidate set, the first terminal selects the second terminal and obtains the sidelink resource from the second terminal. If there is more than one second terminal in the candidate set, the first terminal selects one or more second terminals from the candidate set, and obtains the sidelink resource from the one or more second terminals.

Specifically, how the first terminal selects one or more second terminals from the candidate set belongs to terminal implementation. For example, the first terminal may randomly select one or more second terminals, or select a second terminal that can allocate resources with a shorter time delay or with higher reliability according to the allocable resource of the second terminal.

Figure 7:
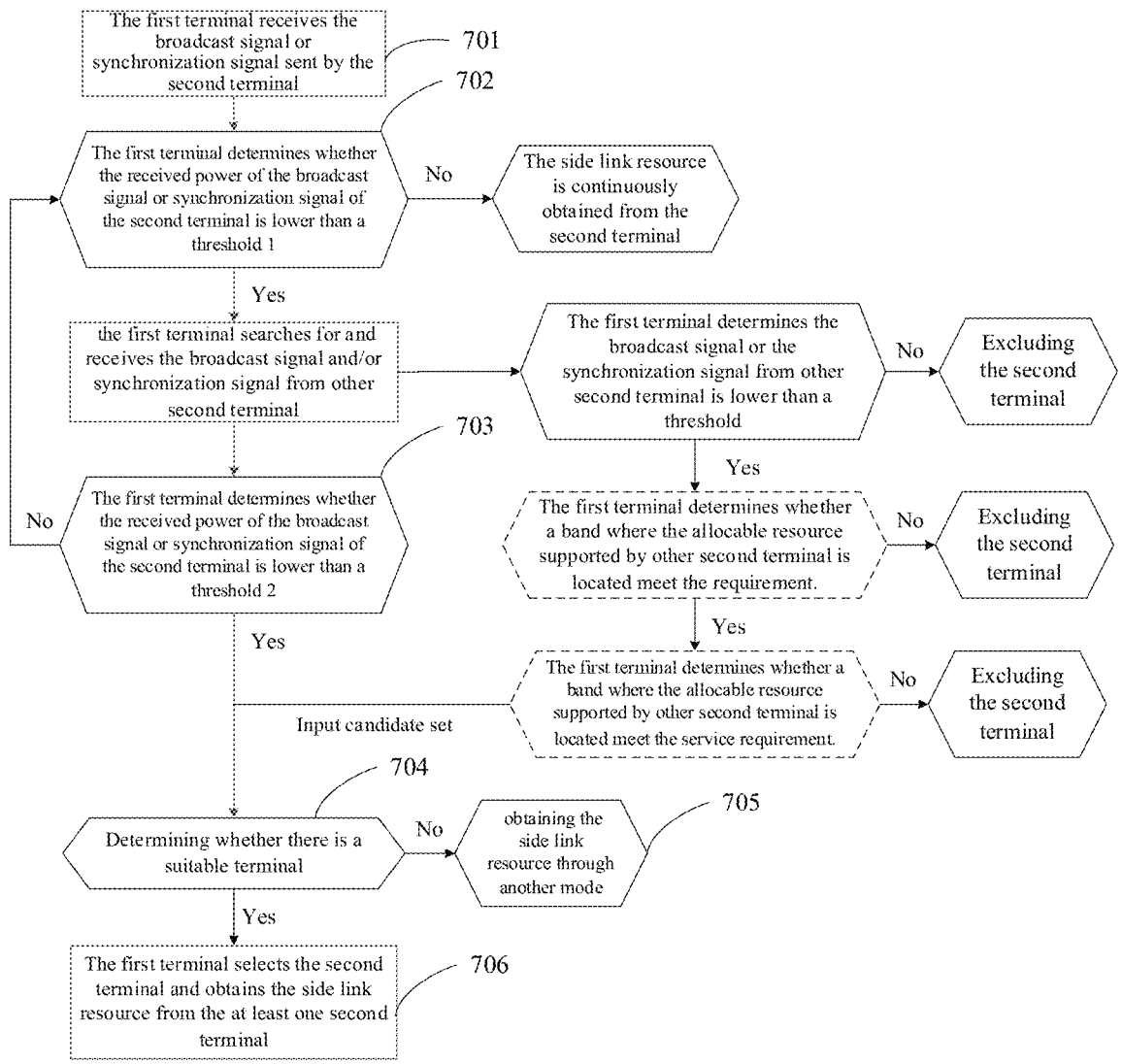
FIG. 7 is the sixth flowchart of the information processing method provided by the embodiments of the present disclosure.

As shown in FIG. 7, the process of the first terminal reselecting the second terminal includes:

Step 701: The first terminal receives the broadcast signal or synchronization signal sent by the second terminal.

Wherein, the broadcast signal sent by the second terminal is periodically broadcasted and includes:
(1) Terminal type indication information, for example, M bits are used to indicate that it is a scheduling terminal, and M is a positive integer greater than 0. For example, M=3, when it is "000", it means that the terminal is a scheduling terminal that can schedule the sidelink resource. For another example, the terminal type indication information is sequence N, or a seed for generating the sequence N, the sequence N is used to scramble broadcast information;
(2) Optionally, a band where the resource allocable by the terminal are located;
(3) Optionally, a pattern of the resource allocable by the terminal, such as SPS pattern or configured grant pattern, etc.;
(4) Terminal ID.

Step 702: The first terminal determines whether the received power of the broadcast signal or synchronization signal of the second terminal is lower than a threshold 1.

Among them, the threshold 1 can be specified by the standard, or system configuration, or pre-configuration. If the received power is lower than the threshold 1, the first terminal is triggered to search for and receive broadcast signals or synchronization signals of other second terminals; if the received power is not lower than the threshold 1, the sidelink resource is continuously obtained from the second terminal. The steps of the first terminal to search for and receive broadcast signals or synchronization signals from other second terminals are the same as in the embodiment shown in FIG. 6, and will not be repeated here.

Step 703: The first terminal determines whether the received power of the broadcast signal or synchronization signal of the second terminal is lower than a threshold 2.

Among them, the threshold 2 can be specified by the standard, or system configuration, or pre-configuration. If the received power is lower than the threshold 2, the first terminal is triggered to select/switch to another second terminal or another resource allocation mode. The specific selection steps are the same as the embodiment shown in FIG. 6 and will not be repeated here. If the received power is not lower than threshold 2, return to step 702 to determine whether it is lower than threshold 1.

That is, in this embodiment, two thresholds are configured: threshold 1 and threshold 2, and the power of threshold 1 is greater than the power of threshold 2. When the received power of the broadcast signal and/or synchronization signal of the second terminal is lower than the threshold 1 but higher than the threshold 2, reselection is triggered, and the first terminal searches for and selects other candidate second terminals, but no actual switching occurs. Only when the received power of the broadcast signal and/or synchronization signal of the second terminal is lower than the threshold 2, the switching occurs, and the first terminal switches from the second terminal to another previously selected second terminal. The advantage of this setting is to avoid false alarms. For example, being lower than threshold 1 is only a temporary phenomenon, and it may be higher than threshold 1 for a period of time.

After that, the first terminal selects the second terminal.

Step 704: Determining whether there is a suitable terminal in the candidate set.

Step 705: If the candidate set is empty, the first terminal obtains the sidelink resource through another mode (for example, mode1 or mode2a or mode2c, etc.).

Step 706: The first terminal selects the second terminal.

If only one second terminal is in the candidate set, the first terminal selects the second terminal and obtains the sidelink resource from the second terminal. If there is more than one second terminal in the candidate set, the first terminal selects one or more second terminals from the candidate set, and obtains the sidelink resource from the one or more second terminals.

Specifically, how the first terminal selects one or more second terminals from the candidate set belongs to terminal implementation. For example, the first terminal may randomly select one or more second terminals, or select a second terminal that can allocate resources with a shorter time delay or with higher reliability according to the allocable resource of the second terminal.

Figure 8:
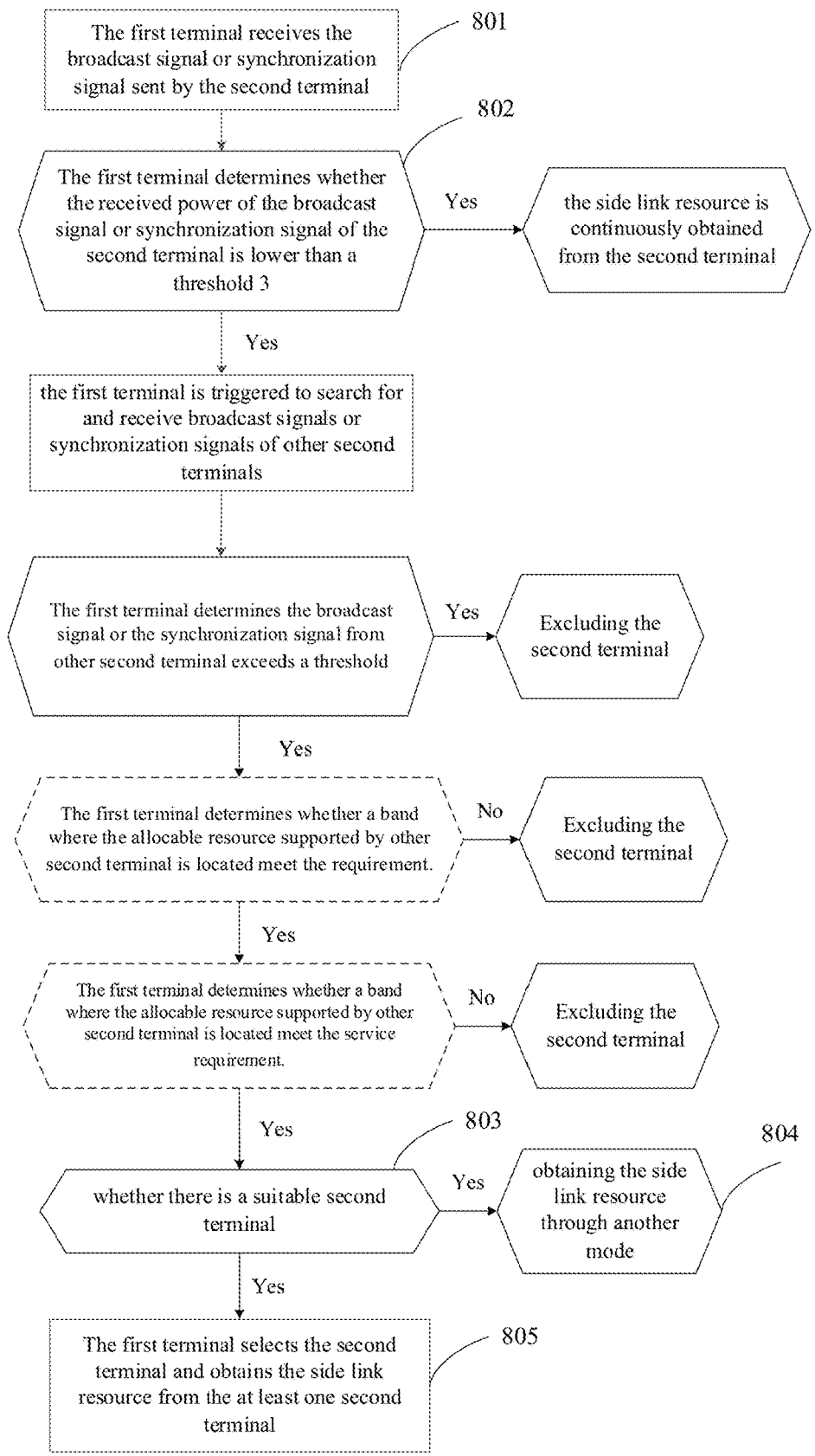
FIG. 8 is the seventh flowchart of the information processing method provided by the embodiments of the present disclosure.

As shown in FIG. 8, the process of the first terminal reselecting the second terminal includes:

Step 801: The first terminal receives the broadcast signal or synchronization signal sent by the second terminal.

Wherein, the broadcast signal sent by the second terminal is periodically broadcasted and includes:

(1) Terminal type indication information, for example, M bits are used to indicate that it is a scheduling terminal, and M is a positive integer greater than 0. For example, M=3, when it is "000", it means that the terminal is a scheduling terminal that can schedule the sidelink resource. For another example, the terminal type indication information is sequence N, or a seed for generating the sequence N, the sequence N is used to scramble broadcast information;

(2) Optionally, a band where the resource allocable by the terminal are located;

(3) Optionally, a pattern of the resource allocable by the terminal, such as SPS pattern or configured grant pattern, etc.;

(4) Terminal ID.

Step 802: The first terminal determines whether the received power of the broadcast signal or synchronization signal of the second terminal is lower than a threshold 3.

Among them, the threshold 3 can be specified by the standard, or system configuration, or pre-configuration. If the received power is lower than the threshold 3, the first terminal is triggered to search for and receive broadcast signals or synchronization signals of other second terminals, and select other suitable second terminals. If it is not lower than the threshold 3, the sidelink resource is continuously obtained from the second terminal.

The step of the first terminal to search for and receive broadcast signals or synchronization signals from other second terminals, and the step of selecting suitable other second terminals are the same as in the embodiment shown in FIG. 6, and will not be repeated here.

The selection of the second terminal by the first terminal specifically includes:

Step 803: Determine whether there is a suitable second terminal in the candidate set.

Step 804: If the candidate set is empty, the first terminal obtains the sidelink resource through another mode (for example, mode1 or mode2a or mode2c, etc.).

Step 805: The first terminal selects the second terminal.

If only one second terminal is in the candidate set, the first terminal selects the second terminal and obtains the sidelink resource from the second terminal. If there is more than one second terminal in the candidate set, the first terminal selects one or more second terminals from the candidate set, and obtains the sidelink resource from the one or more second terminals.

Specifically, how the first terminal selects one or more second terminals from the candidate set belongs to terminal implementation. For example, the first terminal may randomly select one or more second terminals, or select a second terminal that can allocate resources with a shorter time delay or with higher reliability according to the allocable resource of the second terminal.

That is, in this embodiment, only one threshold 3 is configured, and as long as the received power of the broadcast signal and/or synchronization signal is lower than the threshold 3, reselection is triggered.

In addition to the conditions for triggering reselection described in the above embodiments, in the embodiments of the present disclosure, the conditions for triggering reselection may further include:

(1) When the band of allocable resource supported by the second terminal cannot meet the service transmission requirement of the first terminal, and optionally, when the second terminal cannot adjust the band of allocable resource, a reselection is triggered.

(2) When the first terminal sends K times of requesting resource signaling to the second terminal, and K is a positive integer greater than 0, and no resource allocated by the second terminal is received, a reselection is triggered.

(3) When the resource allocable by the second terminal are insufficient to meet the service volume requirement of the first terminal, and optionally, the second terminal cannot adjust the allocable resource, a reselection is triggered.

For example, the first terminal has a large service volume and needs to transmit more information, or the first terminal sends different sidelink information to a plurality of terminals at the same time. At this time, if the resource that can be allocated by second terminal is less, which will cause longer service delay or the reliability is reduced, the first terminal will trigger the reselection.

When the first terminal triggers the reselection, the current second terminal may be reserved and other second terminals may be selected to supplement allocable resources, or the current second terminal may not be reserved, and other second terminals meeting resource requirements may be directly selected.

(4) When the resources allocated by the second terminal cannot meet the service transmission delay or service reliability requirements of the first terminal, and optionally, when the second terminal cannot adjust the allocable resource, a reselection is triggered.

It can be seen from the above that the solution of the embodiment of the present disclosure can solve the problem that the scheduled terminal selects or reselects the scheduling terminal in the mode 2d, so that the scheduled terminal can select a suitable scheduling terminal.

Figure 9:
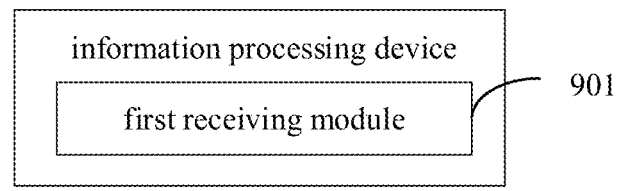
FIG. 9 is the first schematic diagram of the information processing device of the embodiment of the present disclosure.

FIG. 9 is a structural diagram of an information processing device provided by an embodiment of the present disclosure, which is provided in a first terminal. As shown in FIG. 9, the information processing device includes: a first receiving module 901, configured to receive first indication information sent by a second terminal, wherein the first indication information is used to indicate that the second terminal can schedule a sidelink resource; a number of the second terminals is greater than or equal to 1.

Optionally, the first receiving module 901 is specifically configured to receive a broadcast signal sent by the second terminal, and the broadcast signal carrying the first indication information; and/or, receive a synchronization signal sent by the second terminal, and the synchronization signal carrying the first indication information.

Optionally, the first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In addition, in order to facilitate the first terminal to select the second terminal to send the sidelink resource, the broadcast signal also includes at least one of the following information: a band where a resource allocable by the second terminal is located; a pattern of the resource allocable by the second terminal.

Optionally, the device may further include: a selecting module 902, configured to select a target second terminal from the second terminals; wherein the number of the target second terminal is an integer, and the number of the target second terminal is less than or equal to the number of the second terminals.

Optionally, the selecting module 902 is specifically configured to use a second terminal for which a received power of the broadcast signal and/or synchronization signal exceeds the first preset value used as the target second terminal.

Optionally, the selecting module 902 includes: a first selecting sub-module 9021, configured to use a second terminal for which the received power of the broadcast signal and/or synchronization signal exceeds the first preset value and a band where an allocable resource is located is the band supported by the first terminal as the target second terminal; or a second selecting sub-module 9022, configured to use a second terminal for which the received power of the broadcast signal and/or synchronization signal exceeds the first preset value and a pattern of the allocable resource meets requirements of a service supported by the first terminal as the target second terminal.

Optionally, the device may further include: a reselecting module 903, configured to trigger the first terminal to reselect the target second terminal when a trigger condition is met;

Wherein, the trigger condition can be any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

Optionally, in the case the trigger condition is that the received power of the broadcast signal and/or synchronization signal of the target second terminal is less than a second preset value, the second preset value includes a fourth preset value and a fifth preset value, wherein the fourth preset value is greater than the fifth preset value.

The reselecting module 903 is specifically configured to, when the received power of the broadcast signal and/or synchronization signal of the target second terminal is less than the fourth preset value and greater than the fifth preset value, trigger the first terminal to reselect the target second terminal, wherein the first terminal does not switch the target second terminal.

In a case that the received power of the broadcast signal and/or synchronization signal of the target second terminal is less than the fifth preset value, the first terminal switches the target second terminal.

Optionally, the device may further include a second receiving module 904, configured to receive the sidelink resource sent by the target second terminal when the number of the target second terminal is greater than 0; or obtain the sidelink resource through any mode other than Mode2d in the NR system when the number of the target second terminal is 0.

In this embodiment, the meaning of each preset value can refer to the description of the foregoing method embodiment.

For the working principle of the device, refer to the description of the foregoing method embodiment.

In the embodiment of the present disclosure, the first terminal can determine that the second terminal can schedule the sidelink resource according to the first indication information or the broadcast signal or the synchronization signal sent by the second terminal, thereby realizing the determination of the scheduling terminal in NR Mode2.

Figure 10:
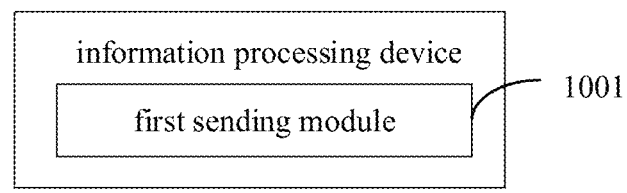
FIG. 10 is the second schematic diagram of the information processing device of the embodiment of the present disclosure.

FIG. 10 is a structural diagram of an information processing device provided by an embodiment of the present disclosure, which is provided in a second terminal. As shown in FIG. 10, the information processing device includes: a first sending module 1001, configured to send first indication information to a first terminal, wherein the first indication information is used to indicate that the second terminal can schedule a sidelink resource; the number of the second terminals is greater than or equal to 1.

Optionally, the first sending module 1001 is specifically configured to send a broadcast signal to the first terminal, the broadcast signal carrying the first indication information; and/or send a synchronization signal to the first terminal, the synchronization signal carrying the first indication information.

Optionally, the first indication information includes: a terminal type and/or a terminal identifier, and the terminal type is used to indicate that the second terminal is a terminal that can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

Optionally, the broadcast signal further includes at least one of the following: a band where a resource allocable by the second terminal is located; a pattern of the resource allocable by the second terminal.

Optionally, the device further includes: a second sending module 1002, configured to send the sidelink resource to the first terminal when the second terminal is the target second terminal.

For the working principle of the device, refer to the description of the foregoing method embodiment.

In the embodiment of the present disclosure, the first terminal can determine that the second terminal can schedule the sidelink resource according to the first indication information or the broadcast signal or the synchronization signal sent by the second terminal, thereby realizing the determination of the scheduled terminal in NR Mode2.

Figure 11:
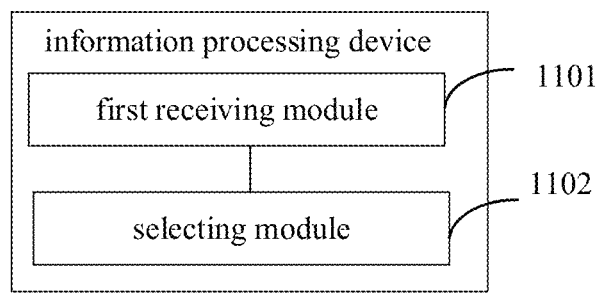
FIG. 11 is the third schematic diagram of the information processing device of the embodiment of the present disclosure.

FIG. 11 is a structural diagram of an information processing device provided in an embodiment of the present disclosure, which is provided in a first terminal. As shown in FIG. 11, the information processing device includes: a first receiving module 1101, configured to receive a broadcast signal and/or a synchronization signal sent by a second terminal; a selecting module 1102, configured to select a target second terminal from the second terminals according to the broadcast signal and/or synchronization signal.

Wherein, the second terminal can schedule the sidelink resource, the number of the second terminal is greater than or equal to 1, the number of the target second terminal is an integer, and the number of the target second terminal is less than or equal to the number of second terminals.

Optionally, the selecting module 1102 is specifically configured to use a second terminal for which a received power of the broadcast signal and/or synchronization signal exceeds a first preset value as the target second terminal.

Optionally, the selecting module 1101 is specifically configured to use a second terminal for which the received power of the broadcast signal and/or synchronization signal exceeds the first preset value and a band where an allocable resource is located is the band supported by the first terminal as the target second terminal; or use a second terminal for which the received power of the broadcast signal and/or synchronization signal exceeds the first preset value and a pattern of the allocable resource meets requirements of a service supported by the first terminal as the target second terminal.

Wherein, the first preset value can be set arbitrarily, and can be specified by a standard, or configured by a network device, or pre-configured.

Optionally, the device further includes: a reselecting module 1103, configured to trigger the first terminal to reselect the target second terminal when the trigger condition is met.

The trigger condition includes any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

Optionally, when the trigger condition is that the received power of the broadcast signal and/or synchronization signal of the target second terminal is less than a second preset value, the second preset value includes a fourth preset value and the fifth preset value, wherein the fourth preset value is greater than the fifth preset value; the reselecting module 1103 is configured to, in the case that the received power of the broadcast signal and/or synchronization signal of the target second terminal is less than a fourth preset value and greater than a fifth preset value, trigger the first terminal to reselect the target second terminal, wherein the first terminal does not switch the target second terminal; in the case that the received power of the broadcast signal and/or synchronization signal of the target second terminal is less than the fifth preset value, the first terminal switches the target second terminal.

Optionally, the device may further include: a second receiving module 1104, configured to receive the sidelink resource sent by the target second terminal when the number of the target second terminal is greater than 0; or obtain the sidelink resource through any mode other than Mode2d in the NR system when the number of the target second terminal is 0.

Optionally, first indication information is carried in the broadcast signal; and/or first indication information is carried in the synchronization signal; the first indication information is used to indicate that the second terminal can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

In addition, the broadcast signal also includes at least one of the following information: a band where a resource allocable by the second terminal is located; a pattern of the resource allocable by the second terminal, such as a semi-static scheduling pattern (SPS pattern) or a configured grant pattern.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and sidelink resources may be scheduled The second terminal of uses the specific sequence to scramble the broadcast signal and/or synchronization signal it sends, thereby indicating that the second terminal is a terminal that can schedule sidelink resources.

Optionally, the first indication information includes: a terminal type and/or a terminal identifier, and the terminal type is used to indicate that the second terminal is a terminal that can schedule the sidelink resource.

Optionally, the broadcast signal further includes at least one of the following information: a band where a resource allocable by the second terminal is located; a pattern of the resource allocable by the second terminal.

For the working principle of the device, refer to the description of the foregoing method embodiment.

In the embodiment of the present disclosure, the first terminal can determine that the second terminal can schedule the sidelink resource according to the first indication information or the broadcast signal or the synchronization signal sent by the second terminal, thereby realizing the determination of the scheduled terminal in NR Mode2.

Figure 12:
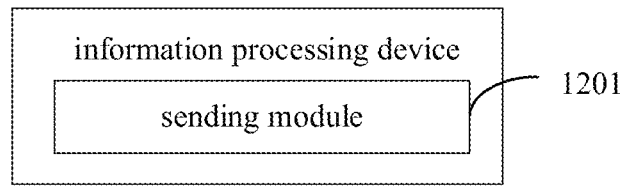
FIG. 12 is a fourth schematic diagram of the information processing device of an embodiment of the present disclosure.

FIG. 12 is a structural diagram of an information processing device provided by an embodiment of the present disclosure, which is provided in a second terminal. As shown in FIG. 12, the information processing device includes: a sending module 1201, configured to send a broadcast signal and/or a synchronization signal to a first terminal, so that the first terminal selects a target second terminal from the second terminals according to the broadcast signal and/or the synchronization signal.

Wherein, the second terminal can schedule sidelink resources, the number of the second terminal is greater than or equal to 1, a number of the target second terminal is an integer, and the number of the target second terminal is less than or equal to the number of second terminals.

Optionally, the device further includes: a second sending module 1202, configured to send the sidelink resource to the first terminal when the second terminal is the target second terminal.

Optionally, first indication information is carried in the broadcast signal; and/or first indication information is carried in the synchronization signal; the first indication information is used to indicate that the second terminal can schedule the sidelink resource.

If only the terminal identifier is included in the first indication information, the first terminal can determine whether the second terminal can schedule the sidelink resource according to the pre-agreement or network configuration based on the terminal identifier. For example, in a multicast scenario, a group header in a terminal group (a terminal that manages terminals in the group) is the second terminal that can schedule the sidelink resource; for another example, in a unicast scenario, a sending terminal (or the terminal initiating to establish the unicast connection) is the second terminal that can schedule the sidelink resource.

The first indication information may be displayed and contained in the broadcast signal and/or synchronization signal. For example, M bits in the broadcast signal are the first indication information, and M is a positive integer greater than 0.

The first indication information may also be implicitly included in the broadcast signal and/or synchronization signal. For example, the first indication information may be a specific sequence or a specific seed for generating a specific sequence, and the second terminal that can schedule the sidelink resource uses the specific sequence to scramble the broadcast signal and/or synchronization signal sent by the second terminal, thereby indicating that the second terminal is a terminal that can schedule the sidelink resource.

Optionally, the first indication information includes: a terminal type and/or a terminal identifier, and the terminal type is used to indicate that the second terminal is a terminal that can schedule the sidelink resource.

Optionally, the broadcast signal further includes at least one of the following information: a band where a resource allocable by the second terminal is located; a pattern of the resource allocable by the second terminal.

For the working principle of the device, refer to the description of the foregoing method embodiment.

In the embodiment of the present disclosure, the first terminal can determine that the second terminal can schedule the sidelink resource according to the first indication information or the broadcast signal or the synchronization signal sent by the second terminal, thereby realizing the determination of the scheduled terminal in NR Mode2.

Figure 13:
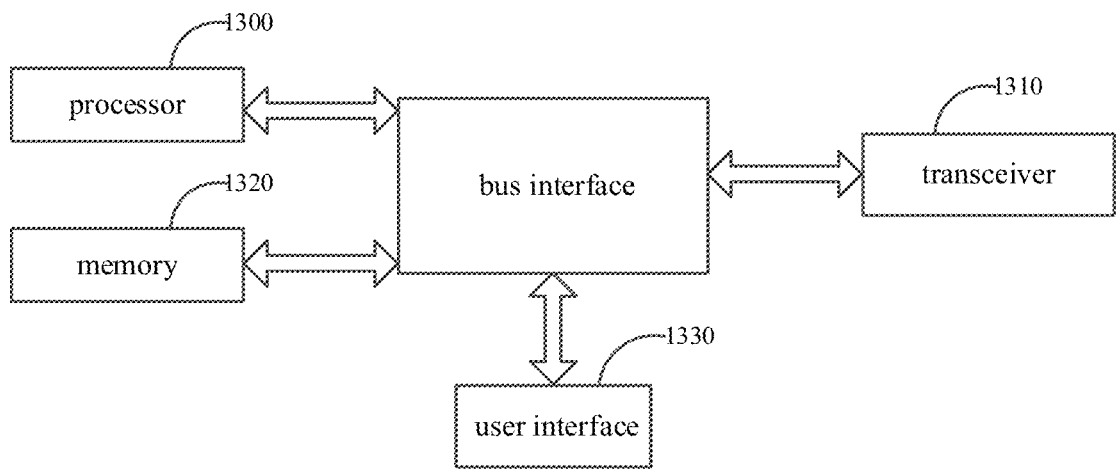
FIG. 13 is the first structural diagram of the terminal provided by an embodiment of the present disclosure.

As shown in FIG. 13, the terminal of the embodiment of the present disclosure includes: a processor 1300; and a transceiver 1310, configured to receive first indication information sent by a second terminal under the control of the processor, wherein the first indication information is used to indicate that the second terminal can schedule a sidelink resource; a number of the second terminals is greater than or equal to 1.

Wherein, in FIG. 13, the bus architecture may include any number of interconnected buses and bridges. Specifically, various circuits of one or more processors represented by the processor 1300 and the memory represented by the memory 1320 are linked together. The bus architecture can also link various other circuits such as peripheral devices, voltage regulators, power management circuits, etc., which are all known in the art, and therefore, no further description will be given herein. The bus interface provides the interface. The transceiver 1310 may be a plurality of elements, including a transmitter and a receiver, and provide a unit for communicating with various other devices on the transmission medium. For different user equipment, the user interface 1330 may also be an interface capable of connecting externally and internally with the required equipment. The connected equipment includes but not limited to a keypad, a display, a speaker, a microphone, a joystick, etc.

The processor 1300 is responsible for managing the bus architecture and general processing, and the memory 1320 can store data used by the processor 1300 when performing operations.

Optionally, the transceiver is further configured to receive a broadcast signal sent by the second terminal, and the broadcast signal carrying the first indication information; and/or, receive a synchronization signal sent by the second terminal, and the synchronization signal carrying the first indication information.

The processor 1300 is further configured to read the program and execute the following steps: selecting a target second terminal from the second terminals.

Wherein, the number of the target second terminal is an integer, and the number of the target second terminal is less than or equal to the number of the second terminals.

The processor 1300 is further configured to read the program and execute the following steps: using a second terminal for which a received power of the broadcast signal and/or synchronization signal exceeds the first preset value used as the target second terminal.

The processor 1300 is further configured to read the program and execute the following steps: using a second terminal for which the received power of the broadcast signal and/or synchronization signal exceeds the first preset value and a band where an allocable resource is located is the band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

The processor 1300 is further configured to read the program and execute the following steps: triggering the first terminal to reselect the target second terminal when a trigger condition is met.

Wherein, the trigger condition can be any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

In the case the trigger condition is that the received power of the broadcast signal and/or synchronization signal of the target second terminal is less than a second preset value, the second preset value includes a fourth preset value and a fifth preset value, wherein the fourth preset value is greater than the fifth preset value; the processor 1300 is further configured to read the program and execute the following steps: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in a case that the received power of the broadcast signal and/or synchronization signal of the target second terminal is less than the fifth preset value, the first terminal switches the target second terminal.

The processor 1300 is further configured to read the program and execute the following steps: receiving the sidelink resource sent by the target second terminal when the number of the target second terminal is greater than 0; or obtaining the sidelink resource through any mode other than Mode2d in the NR system when the number of the target second terminal is 0.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

Figure 14:
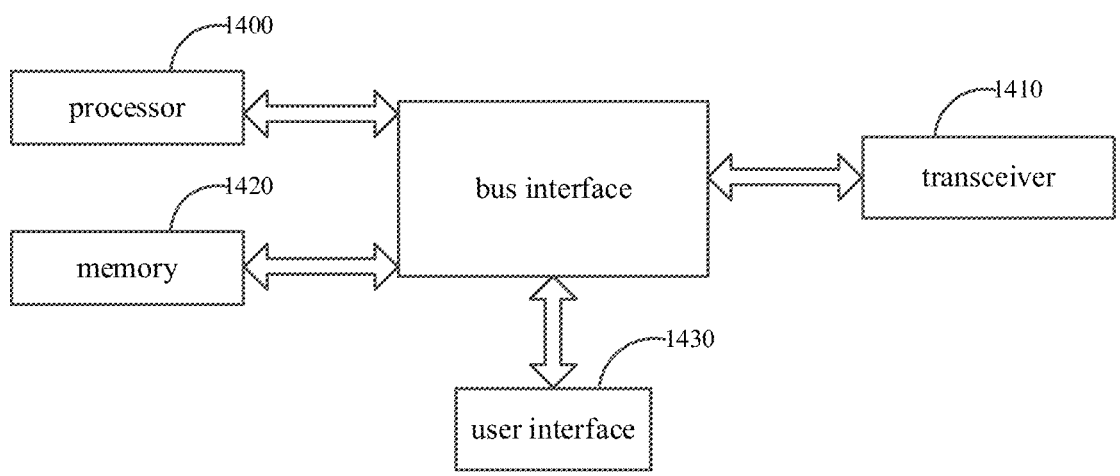
FIG. 14 is the second structural diagram of the terminal provided by an embodiment of the present disclosure.

As shown in FIG. 14, the terminal of the embodiment of the present disclosure includes: a processor 1400; and a transceiver 1410, configured to send first indication information to a first terminal, wherein the first indication information is used to indicate that the second terminal can schedule a sidelink resource; the number of the second terminals is greater than or equal to 1.

Wherein, in FIG. 14, the bus architecture may include any number of interconnected buses and bridges. Specifically, various circuits of one or more processors represented by the processor 1400 and the memory represented by the memory 1420 are linked together. The bus architecture can also link various other circuits such as peripheral devices, voltage regulators, power management circuits, etc., which are all known in the art, and therefore, no further description will be given herein. The bus interface provides the interface. The transceiver 1410 may be a plurality of elements, including a transmitter and a receiver, and provide a unit for communicating with various other devices on the transmission medium. For different user equipment, the user interface 1430 may also be an interface capable of connecting externally and internally with the required equipment. The connected equipment includes but not limited to a keypad, a display, a speaker, a microphone, a joystick, and the like.

The processor 1400 is responsible for managing the bus architecture and general processing, and the memory 1420 can store data used by the processor 1400 when performing operations.

Optionally, the transceiver is further configured to send a broadcast signal to the first terminal under the control of the processor, the broadcast signal carrying the first indication information; and/or send a synchronization signal to the first terminal, the synchronization signal carrying the first indication information.

The transceiver is further configured to send the side uplink resource to the first terminal when the terminal is the target terminal.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

Figure 15:
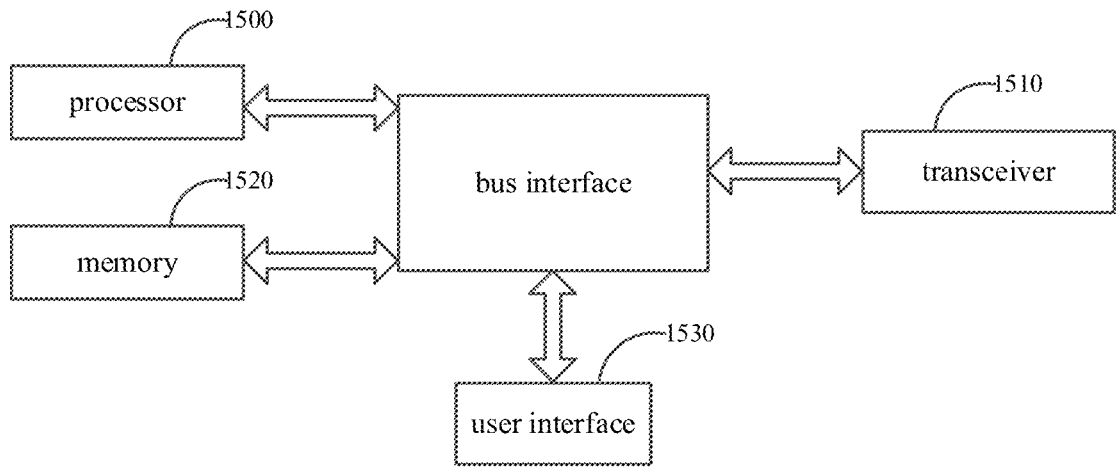
FIG. 15 is the third structural diagram of the terminal provided by an embodiment of the present disclosure.

As shown in FIG. 15, the terminal of the embodiment of the present disclosure includes: a processor 1500 and a transceiver 1510.

The transceiver 1510 is configured to receive a broadcast signal and/or a synchronization signal sent by a second terminal under the control of the processor; the processor 1500 is configured to read the program and perform the following steps: selecting a target second terminal from the second terminals according to the broadcast signal and/or synchronization signal.

Optionally, the transceiver 1510 is configured to receive a broadcast signal and/or a synchronization signal sent by a second terminal under the control of the processor; select a target second terminal from the second terminals according to the broadcast signal and/or synchronization signal.

Wherein, the second terminal can schedule the sidelink resource, the number of the second terminal is greater than or equal to 1, the number of the target second terminal is an integer, and the number of the target second terminal is less than or equal to the number of second terminals.

Wherein, in FIG. 15, the bus architecture may include any number of interconnected buses and bridges. Specifically, various circuits of one or more processors represented by the processor 1500 and the memory represented by the memory 1520 are linked together. The bus architecture can also link various other circuits such as peripheral devices, voltage regulators, power management circuits, etc., which are all known in the art, and therefore, no further description will be given herein. The bus interface provides the interface. The transceiver 1510 may be a plurality of elements, including a transmitter and a receiver, and provide a unit for communicating with various other devices on the transmission medium. For different user equipment, the user interface 1530 may also be an interface capable of connecting externally and internally with the required equipment. The connected equipment includes but not limited to a keypad, a display, a speaker, a microphone, a joystick, and the like.

The processor 1500 is responsible for managing the bus architecture and general processing, and the memory 1520 can store data used by the processor 1500 when performing operations.

The processor 1500 is further configured to read the program and execute the following steps: using a second terminal for which a received power of the broadcast signal and/or synchronization signal exceeds a first preset value as the target second terminal.

The processor 1500 is further configured to read the program and execute the following steps: using a second terminal for which the received power of the broadcast signal and/or synchronization signal exceeds the first preset value and a band where an allocable resource is located is the band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

The processor 1500 is further configured to read the program and execute the following steps: triggering the first terminal to reselect the target second terminal when the trigger condition is met.

The trigger condition includes any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

When the trigger condition is that the received power of the broadcast signal and/or synchronization signal of the target second terminal is less than a second preset value, the second preset value includes a fourth preset value and the fifth preset value, wherein the fourth preset value is greater than the fifth preset value; the processor 1500 is further configured to read the program and execute the following steps: in the case that the received power of the broadcast signal and/or synchronization signal of the target second terminal is less than a fourth preset value and greater than a fifth preset value, triggering the first terminal to reselect the target second terminal, wherein the first terminal does not switch the target second terminal; in the case that the received power of the broadcast signal and/or synchronization signal of the target second terminal is less than the fifth preset value, the first terminal switches the target second terminal.

The processor 1500 is further configured to read the program and execute the following steps: receiving the sidelink resource sent by the target second terminal when the number of the target second terminal is greater than 0; or obtaining the sidelink resource through any mode other than Mode2d in the NR system when the number of the target second terminal is 0.

Wherein, first indication information is carried in the broadcast signal; and/or first indication information is carried in the synchronization signal; the first indication information is used to indicate that the second terminal can schedule the sidelink resource.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

Figure 16:
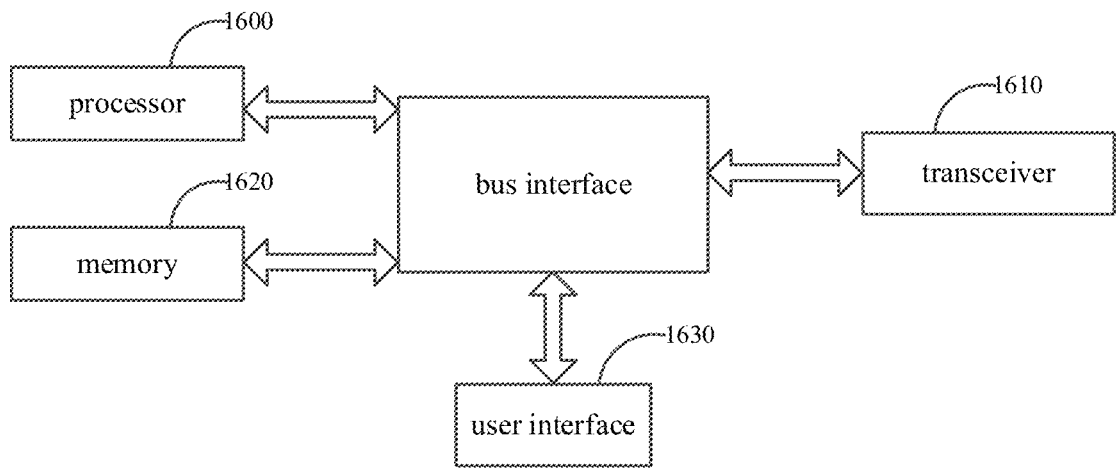
FIG. 16 is the fourth structural diagram of the terminal provided by an embodiment of the present disclosure.

As shown in FIG. 16, the terminal of the embodiment of the present disclosure includes: a processor 1600; a transceiver 1610, configured to send a broadcast signal and/or a synchronization signal to a first terminal, so that the first terminal selects a target second terminal from the second terminals according to the broadcast signal and/or the synchronization signal.

Wherein, the second terminal can schedule sidelink resources, the number of the second terminal is greater than or equal to 1, a number of the target second terminal is an integer, and the number of the target second terminal is less than or equal to the number of second terminals.

Wherein, in FIG. 16, the bus architecture may include any number of interconnected buses and bridges. Specifically, various circuits of one or more processors represented by the processor 1600 and the memory represented by the memory 1620 are linked together. The bus architecture can also link various other circuits such as peripheral devices, voltage regulators, power management circuits, etc., which are all known in the art, and therefore, no further description will be given herein. The bus interface provides the interface. The transceiver 1610 may be a plurality of elements, including a transmitter and a receiver, and provide a unit for communicating with various other devices on the transmission medium. For different user equipment, the user interface 1630 may also be an interface capable of connecting externally and internally with the required equipment. The connected equipment includes but is not limited to a keypad, a display, a speaker, a microphone, a joystick, and the like.

The processor 1600 is responsible for managing the bus architecture and general processing, and the memory 1620 can store data used by the processor 1600 when performing operations.

The processor 1600 is further configured to read the program and execute the following steps: sending the sidelink resource to the first terminal when the second terminal is the target second terminal.

Optionally, first indication information is carried in the broadcast signal; and/or first indication information is carried in the synchronization signal; the first indication information is used to indicate that the second terminal can schedule the sidelink resource.

Wherein, the first indication information includes: a terminal type and/or a terminal identifier, and the terminal type is used to indicate that the terminal is a terminal that can schedule the sidelink resource.

Wherein, the broadcast signal also includes at least one of the following information: a band where a resource allocable by the second terminal is located; a pattern of the resource allocable by the second terminal.

In addition, the computer-readable storage medium of the embodiment of the present disclosure is used to store a program, and the program can be executed by a processor to implement the following steps:

Receiving first indication information sent by a second terminal, wherein the first indication information is used to indicate that the second terminal can schedule a sidelink resource; a number of the second terminals is greater than or equal to 1.

Wherein, the receiving the first indication information sent by the second terminal includes: receiving a broadcast signal sent by the second terminal, and the broadcast signal carrying the first indication information; and/or, receiving a synchronization signal sent by the second terminal, and the synchronization signal carrying the first indication information.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

Wherein, the method further includes: selecting a target second terminal from the second terminals; wherein the number of the target second terminal is an integer, and the number of the target second terminal is less than or equal to the number of the second terminals.

Wherein, the selecting the target second terminal from the second terminals includes: using the second terminal for which a received power of the broadcast signal and/or synchronization signal exceeds the first preset value as the target second terminal.

Wherein, using the second terminal for which a received power of the broadcast signal and/or synchronization signal exceeds the first preset value as the target second terminal, includes: using a second terminal for which the received power of the broadcast signal and/or synchronization signal exceeds the first preset value and a band where an allocable resource is located is the band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

Wherein, the method further includes: triggering the first terminal to reselect the target second terminal when the trigger condition is met.

The trigger condition includes any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

In the case the trigger condition is that the received power of the broadcast signal and/or synchronization signal of the target second terminal is less than a second preset value, the second preset value includes a fourth preset value and a fifth preset value, wherein the fourth preset value is greater than the fifth preset value; the triggering the first terminal to reselect the target second terminal includes: in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal; in a case that the received power of the broadcast signal and/or synchronization signal of the target second terminal is less than the fifth preset value, the first terminal switches the target second terminal.

Wherein, the method further includes: receiving the sidelink resource sent by the target second terminal when the number of the target second terminal is greater than 0; or obtaining the sidelink resource through any mode other than Mode2d in the NR system when the number of the target second terminal is 0.

In addition, the computer-readable storage medium of the embodiment of the present disclosure is used to store a program, and the program can be executed by a processor to implement the following steps: sending first indication information to a first terminal, wherein the first indication information is used to indicate that the second terminal can schedule a sidelink resource; the number of the second terminals is greater than or equal to 1.

Wherein, the sending the first indication information to the first terminal includes: sending a broadcast signal to the first terminal, the broadcast signal carrying the first indication information; and/or sending a synchronization signal to the first terminal, the synchronization signal carrying the first indication information.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

Wherein, the method further includes: when the second terminal is the target second terminal, sending the sidelink resource to the first terminal.

In addition, the computer-readable storage medium of the embodiment of the present disclosure is used to store a program, and the program can be executed by a processor to implement the following steps: receiving a broadcast signal and/or a synchronization signal sent by a second terminal; selecting a target second terminal from the second terminals according to the broadcast signal and/or synchronization signal.

Wherein, the second terminal can schedule the sidelink resource, the number of the second terminal is greater than or equal to 1, the number of the target second terminal is an integer, and the number of the target second terminal is less than or equal to the number of second terminals.

Wherein, the selecting the target second terminal from the second terminals includes: using a second terminal for which a received power of the broadcast signal and/or synchronization signal exceeds a first preset value as the target second terminal.

Wherein, using a second terminal for which a received power of the broadcast signal and/or synchronization signal exceeds a first preset value as the target second terminal includes: using a second terminal for which the received power of the broadcast signal and/or synchronization signal exceeds the first preset value and a band where an allocable resource is located is the band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

Wherein, the method further includes: triggering the first terminal to reselect the target second terminal when the trigger condition is met.

The trigger condition includes any one of the following:

The received power of the broadcast signal and/or synchronization signal of the target second terminal is less than a second preset value.

The band where the allocable resource of the target second terminal is located cannot meet the service transmission requirement of the first terminal.

The allocable resource of the target second terminal cannot meet the service volume demand of the first terminal.

The number of times the first terminal sends signaling for requesting a resource to the target second terminal is greater than a third preset value, and a resource allocated by the target second terminal is not received.

The resources allocated by the target second terminal cannot meet the transmission delay or reliability requirements of the first terminal.

When the trigger condition is that the received power of the broadcast signal and/or synchronization signal of the target second terminal is less than a second preset value, the second preset value includes a fourth preset value and the fifth preset value, wherein the fourth preset value is greater than the fifth preset value, the triggering the first terminal to reselect the target second terminal includes: in the case that the received power of the broadcast signal and/or synchronization signal of the target second terminal is less than a fourth preset value and greater than a fifth preset value, triggering the first terminal to reselect the target second terminal, wherein the first terminal does not switch the target second terminal; in the case that the received power of the broadcast signal and/or synchronization signal of the target second terminal is less than the fifth preset value, the first terminal switches the target second terminal.

Wherein, the method further includes: receiving the sidelink resource sent by the target second terminal when the number of the target second terminal is greater than 0; or obtaining the sidelink resource through any mode other than Mode2d in the NR system when the number of the target second terminal is 0.

Wherein, first indication information is carried in the broadcast signal; and/or first indication information is carried in the synchronization signal; the first indication information is used to indicate that the second terminal can schedule the sidelink resource.

Wherein, the first indication information includes: a terminal type and/or a terminal identifier, and the terminal type is used to indicate that the second terminal is a terminal that can schedule the sidelink resource.

Wherein, the broadcast signal also includes at least one of the following information: a band where a resource allocable by the second terminal is located; a pattern of the resource allocable by the second terminal.

In addition, the computer-readable storage medium of the embodiment of the present disclosure is used to store a program, and the program can be executed by a processor to implement the following steps: sending a broadcast signal and/or a synchronization signal to a first terminal, so that the first terminal selects a target second terminal from the second terminals according to the broadcast signal and/or the synchronization signal.

Wherein, the second terminal can schedule sidelink resources, the number of the second terminal is greater than or equal to 1, a number of the target second terminal is an integer, and the number of the target second terminal is less than or equal to the number of second terminals.

Wherein, the method further includes: sending the sidelink resource to the first terminal when the second terminal is the target second terminal.

Optionally, first indication information is carried in the broadcast signal; and/or first indication information is carried in the synchronization signal; the first indication information is used to indicate that the second terminal can schedule the sidelink resource.

Wherein, the first indication information includes: a terminal type and/or a terminal identifier, and the terminal type is used to indicate that the terminal is a terminal that can schedule the sidelink resource.

Wherein, the broadcast signal also includes at least one of the following information: a band where a resource allocable by the second terminal is located; a pattern of the resource allocable by the second terminal.

In the several embodiments provided in this disclosure, it should be understood that the method and device can be implemented in other ways. For example, the device embodiments described above are only illustrative. For example, the division of the units is only a logical function division, and there may be other divisions in actual implementation, for example, multiple units or components may be combined or can be integrated into another system, or some elements can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The integrated unit may be implemented in the form of hardware, or in the form of hardware plus software functional units.

The integrated unit implemented in the form of a software functional unit may be stored in a computer readable storage medium. The software functional unit is stored in a storage medium, and includes several instructions to enable a computer device (which may be a personal computer, a server, or a network device, etc.) to execute some steps of the methods in the various embodiments of the present disclosure. The storage media include: U disk, mobile hard disk, read-only memory (ROM), random access memory (RAM), magnetic disks or optical disks, etc., which can store program codes.

It can be understood that the embodiments described in the present disclosure can be implemented by hardware, software, firmware, middleware, microcode, or a combination thereof. For hardware implementation, the processing unit can be implemented in one or more application specific integrated circuits (ASIC), digital signal processor (DSP), digital signal processing device (DSP Device, DSPD), programmable Logic Device (PLD), Field-Programmable Gate Array (FPGA), general-purpose processors, controllers, microcontrollers, microprocessors, and other electronic units for performing the functions described in this disclosure or the combination thereof.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented within the processor or external to the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information processing method applied to a first terminal, comprising:
   receiving first indication information sent by a second terminal, wherein the first indication information is used to indicate that the second terminal is able to schedule a sidelink resource; a number of the second terminal is greater than or equal to 1;
   wherein the method further comprises selecting a target second terminal from the second terminal,
   wherein a number of the target second terminal is an integer, and the number of the target second terminal is less than or equal to a number of the second terminal;
   wherein the method further comprises triggering the first terminal to reselect the target second terminal when a trigger condition is met,
   wherein the trigger condition comprises any one of the following:
   the received power of the broadcast signal and/or synchronization signal of the target second terminal is less than a second preset value;
   the band where the allocable resource of the target second terminal is located cannot meet a service transmission requirement of the first terminal;
   the allocable resource of the target second terminal cannot meet a service volume requirement of the first terminal,
   a number of times of the first terminal sending signaling for requesting a resource to the target second terminal is greater than a third preset value, and a resource allocated by the target second terminal is not received;
   the resources allocated by the target second terminal cannot meet a transmission delay or reliability requirement of the first terminal;
   wherein in the case that the trigger condition is that the received power of the broadcast signal and/or synchronization signal of the target second terminal is less than a second preset value, the second preset value comprises a fourth preset value and a fifth preset value, the fourth preset value is greater than the fifth preset value;
   the triggering the first terminal to reselect the target second terminal comprises:
   in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal;
   in the case that the received power of the broadcast signal and/or synchronization signal of the target second terminal is less than the fifth preset value, switching, by the first terminal, the target second terminal.

2. The method according to claim 1, wherein the selecting a target second terminal from the second terminal comprises:
   using a second terminal for which a received power of the broadcast signal and/or synchronization signal exceeds a first preset value as the target second terminal.

3. The method according to claim 2, wherein the using a second terminal for which a received power of the broadcast signal and/or synchronization signal exceeds a first preset value as the target second terminal, comprising:

using a second terminal for which the received power of the broadcast signal and/or synchronization signal exceeds the first preset value and a band where an allocable resource is located is a band supported by the first terminal as the target second terminal; or using a second terminal for which the received power of the broadcast signal and/or synchronization signal exceeds the first preset value and a pattern of the allocable resource meets requirements of a service supported by the first terminal as the target second terminal.

4. The method according to claim 1, further comprising:
receiving a sidelink resource sent by the target second terminal when the number of the target second terminal is greater than 0; or
obtaining the sidelink resource through any mode other than Mode2d in a new radio (NR) system when the number of the target second terminal is 0.

5. An information processing method applied to a second terminal, comprising:
sending first indication information to a first terminal,
wherein the first indication information is used to indicate that the second terminal is able to schedule a sidelink resource; a number of the second terminal is greater than or equal to 1;
the method further comprises:
selecting, by the first terminal, a target second terminal from the second terminal,
wherein a number of the target second terminal is an integer, and the number of the target second terminal is less than or equal to a number of the second terminal;
and the method further comprises: the first terminal is triggered to reselect the target second terminal when a trigger condition is met,
the trigger condition comprises any one of the following:
the received power of the broadcast signal and/or synchronization signal of the target second terminal is less than a second preset value;
the band where the allocable resource of the target second terminal is located cannot meet a service transmission requirement of the first terminal;
the allocable resource of the target second terminal cannot meet a service volume requirement of the first terminal,
a number of times of the first terminal sending signaling for requesting a resource to the target second terminal is greater than a third preset value, and a resource allocated by the target second terminal is not received;
the resources allocated by the target second terminal cannot meet a transmission delay or reliability requirement of the first terminal;
wherein in the case that the trigger condition is that the received power of the broadcast signal and/or synchronization signal of the target second terminal is less than a second preset value, the second preset value comprises a fourth preset value and a fifth preset value, the fourth preset value is greater than the fifth preset value;
the triggering the first terminal to reselect the target second terminal comprises:
in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal;
in the case that the received power of the broadcast signal and/or synchronization signal of the target second terminal is less than the fifth preset value, switching, by the first terminal, the target second terminal.

6. An information processing method applied to a first terminal, comprising:
receiving a broadcast signal and/or a synchronization signal sent by a second terminal;
selecting a target second terminal from the second terminal according to the broadcast signal and/or synchronization signal,
wherein the second terminal is able to schedule a sidelink resource, a number of the second terminal is greater than or equal to 1, a number of the target second terminal is an integer, and the number of the target second terminal is less than or equal to the number of second terminal;
wherein the method further comprises triggering the first terminal to reselect the target second terminal when a trigger condition is met,
wherein the trigger condition comprises any one of the following:
the received power of the broadcast signal and/or synchronization signal of the target second terminal is less than a second preset value;
the band where the allocable resource of the target second terminal is located cannot meet a service transmission requirement of the first terminal;
the allocable resource of the target second terminal cannot meet a service volume requirement of the first terminal,
a number of times of the first terminal sending signaling for requesting a resource to the target second terminal is greater than a third preset value, and a resource allocated by the target second terminal is not received;
the resources allocated by the target second terminal cannot meet a transmission delay or reliability requirement of the first terminal;
wherein in the case that the trigger condition is that the received power of the broadcast signal and/or synchronization signal of the target second terminal is less than a second preset value, the second preset value comprises a fourth preset value and a fifth preset value, the fourth preset value is greater than the fifth preset value;
the triggering the first terminal to reselect the target second terminal comprises:
in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal;
in the case that the received power of the broadcast signal and/or synchronization signal of the target second terminal is less than the fifth preset value, switching, by the first terminal, the target second terminal.

7. An information processing method applied to a second terminal, comprising:
sending a broadcast signal and/or a synchronization signal to a first terminal, so that the first terminal selects a target second terminal from the second terminal according to the broadcast signal and/or the synchronization signal;
wherein the second terminal is able to schedule a sidelink resource, a number of the second terminal is greater than or equal to 1, a number of the target second terminal is an integer, and the number of the target second terminal is less than or equal to the number of the second terminal;

the first terminal is triggered to reselect the target second terminal when a trigger condition is met, wherein the trigger condition includes any one of the following:

the received power of the broadcast signal and/or synchronization signal of the target second terminal is less than a second preset value;

the band where the allocable resource of the target second terminal is located cannot meet a service transmission requirement of the first terminal;

the allocable resource of the target second terminal cannot meet a service volume requirement of the first terminal, a number of times of the first terminal sending signaling for requesting a resource to the target second terminal is greater than a third preset value, and a resource allocated by the target second terminal is not received;

the resources allocated by the target second terminal cannot meet a transmission delay or reliability requirement of the first terminal;

wherein in the case that the trigger condition is that the received power of the broadcast signal and/or synchronization signal of the target second terminal is less than a second preset value, the second preset value comprises a fourth preset value and a fifth preset value, the fourth preset value is greater than the fifth preset value;

the triggering the first terminal to reselect the target second terminal comprises:

in the case that the received power of the broadcast signal and/or synchronization signal of the target second terminal is less than the fourth preset value and greater than the fifth preset value, triggering the first terminal to reselect the target second terminal, wherein the first terminal does not switch the target second terminal;

in the case that the received power of the broadcast signal and/or synchronization signal of the target second terminal is less than the fifth preset value, switching, by the first terminal, the target second terminal.

8. A terminal, comprising: a transceiver, a memory, a processor, and a program stored in the memory and executed by the processor; wherein, The transceiver is configured to implement the method according to claim 1.

9. A terminal, comprising: a transceiver, a memory, a processor, and a program stored on the memory and executed by the processor; wherein, the transceiver is configured to implement the method according to claim 5.

10. A terminal, comprising: a transceiver, a memory, a processor, and a program stored in the memory and executed by the processor; wherein, the transceiver is configured to implement the method according to claim 6.

11. A terminal, comprising: a transceiver, a memory, a processor, and a program stored on the memory and executed by the processor; wherein, the transceiver is configured to implement the method according to claim 7.

12. The method according to claim 1, wherein the receiving first indication information sent by a second terminal comprises:

receiving a broadcast signal sent by the second terminal, and the broadcast signal carrying the first indication information; and/or, receiving a synchronization signal sent by the second terminal, and the synchronization signal carrying the first indication information.

13. The method according to claim 12, wherein the first indication information comprises: a terminal type and/or a terminal identifier, and the terminal type is used to indicate that the second terminal is able to schedule the sidelink resource.

14. The method according to claim 13, wherein the broadcast signal further comprises at least one of the following: a band where a resource allocable by the second terminal is located; a pattern of the resource allocable by the second terminal.

15. The method according to claim 5, wherein the sending first indication information to a first terminal comprises:

sending a broadcast signal to the first terminal, the broadcast signal carrying the first indication information; and/or sending a synchronization signal to the first terminal, the synchronization signal carrying the first indication information.

16. The method according to claim 15, wherein the first indication information comprises: a terminal type and/or a terminal identifier, and the terminal type is used to indicate that the second terminal is able to schedule the sidelink resource.

17. The method according to claim 16, wherein the broadcast signal further comprises at least one of the following information: a band where a resource allocable by the second terminal is located; a pattern of the resource allocable by the second terminal.

* * * * *